US 9,098,906 B2

(12) United States Patent
Bruls et al.

(10) Patent No.: US 9,098,906 B2
(45) Date of Patent: Aug. 4, 2015

(54) GENERATION OF HIGH DYNAMIC RANGE IMAGES FROM LOW DYNAMIC RANGE IMAGES IN MULTIVIEW VIDEO CODING

(75) Inventors: Wilhelmus Hendrikus Alfonsus Bruls, Eindhoven (NL); Remco Theodorus Johannes Muijs, Meteren (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 215 days.

(21) Appl. No.: 13/808,232

(22) PCT Filed: Jul. 5, 2011

(86) PCT No.: PCT/IB2011/052970
§ 371 (c)(1),
(2), (4) Date: Jan. 3, 2013

(87) PCT Pub. No.: WO2012/004741
PCT Pub. Date: Jan. 12, 2012

(65) Prior Publication Data
US 2013/0108183 A1 May 2, 2013

(30) Foreign Application Priority Data

Jul. 6, 2010 (EP) .................................... 10168565
Nov. 18, 2010 (EP) .................................... 10191709

(51) Int. Cl.
*G06K 9/00* (2006.01)
*G06T 9/00* (2006.01)
(Continued)

(52) U.S. Cl.
CPC .............. *G06T 9/004* (2013.01); *H04N 19/103* (2014.11); *H04N 19/105* (2014.11); *H04N 19/14* (2014.11);
(Continued)

(58) Field of Classification Search
None
See application file for complete search history.

(56) References Cited

U.S. PATENT DOCUMENTS 4,288,816 A * 9/1981 Kashioka et al. ............. 382/232
5,619,256 A * 4/1997 Haskell et al. ................. 348/43
(Continued)

FOREIGN PATENT DOCUMENTS

WO 2008084417 A2 7/2008
WO 2009040701 A2 4/2009
(Continued)

OTHER PUBLICATIONS

Liu, Shan et al "Bit-Depth Scalable Coding for High Dynamic Range Video", SPIE Conference on Visual Communications and Image Processing (VCIP), vol. 6822, TR21007-078, 2008, (published before this application Jul. 2010).

(Continued)

*Primary Examiner* — Chan Park
*Assistant Examiner* — Eueng-Nan Yeh

(57) ABSTRACT

Several approaches are disclosed for combining HDR and 3D image structure analysis and coding, in particular an encoding apparatus for encoding a first view high dynamic range image and a second view high dynamic range image comprising: first and second HDR image receivers (203, 1201) arranged to receive the first view high dynamic range image and a second view high dynamic range image; a predictor (209) arranged to predict the first view high dynamic range image from a low dynamic range representation of the first view high dynamic range image; and a view predictor (1203) to predict the second view high dynamic range image from at least one of the first view high dynamic range image, a low dynamic range representation of the second view high dynamic range image, or a low dynamic range representation of the first view high dynamic range image.

11 Claims, 22 Drawing Sheets

(51) Int. Cl.
*H04N 19/597* (2014.01)
*H04N 19/105* (2014.01)
*H04N 19/30* (2014.01)
*H04N 19/593* (2014.01)
*H04N 19/103* (2014.01)
*H04N 19/14* (2014.01)
*H04N 19/154* (2014.01)
*H04N 19/184* (2014.01)
*H04N 19/187* (2014.01)

(52) U.S. Cl.
CPC ........... *H04N 19/154* (2014.11); *H04N 19/184* (2014.11); *H04N 19/187* (2014.11); *H04N 19/30* (2014.11); *H04N 19/593* (2014.11); *H04N 19/597* (2014.11)

(56) References Cited

U.S. PATENT DOCUMENTS

2006/0056520 A1* 3/2006 Comer et al. ................ 375/242
2009/0102946 A1 4/2009 Tischer
2009/0175338 A1 7/2009 Segall
2009/0190662 A1 7/2009 Park
2011/0194618 A1* 8/2011 Gish et al. ................ 375/240.25

FOREIGN PATENT DOCUMENTS

WO 2010043773 A1 4/2010
WO 2012004709 A1 1/2012

OTHER PUBLICATIONS

Mantiuk, Rafal et al "Backward Compatible High Dynamic Range MPEG Video Compression", ACM Transactions on Graphics, vol. 25, No. 3, Jul. 2006, pp. 713-723.

* cited by examiner

GENERATION OF HIGH DYNAMIC RANGE IMAGES FROM LOW DYNAMIC RANGE IMAGES IN MULTIVIEW VIDEO CODING

FIELD OF THE INVENTION

The invention relates to generation of high dynamic range images from low dynamic range images and in particular combining high dynamic range information with 3D information.

BACKGROUND OF THE INVENTION

Digital encoding of various source signals has become increasingly important over the last decades as digital signal representation and communication increasingly has replaced analogue representation and communication. Continuous research and development is ongoing in how to improve the quality that can be obtained from encoded images and video sequences while at the same time keeping the data rate to acceptable levels.

An important factor for perceived image quality is the dynamic range that can be reproduced when an image is displayed. However, conventionally, the dynamic range of reproduced images has tended to be substantially reduced in relation to normal vision. In real scenes the dynamic range of different objects in regions of different illumination may easily correspond to a dynamic range of 10.000:1 or more (14 bit linear), where very precise luminance gradations may occur in all luminance levels, e.g. in a cave illuminated with narrow beam illuminations, and hence, whatever the final optimal rendering on a particular device, the image encoding may desire to contain as much useful information on that as possible (while also spending as little bits as possible, e.g. on fixed memory space media such as bluray disk, or limited bandwidth network connections).

Traditionally, dynamic range of image sensors and displays has been confined to about 2-3 orders of magnitude, e.g. traditional television tried to image for a 40:1 dynamic range, which is a typical range for printing too, i.e. 8 bits were for those media considered sufficient, but they are no longer sufficient for recently emerging higher quality rendering devices, and/or smarter image processing especially related to optimal rendering on those devices. I.e., it has traditionally been possible to store and transmit images in 8-bit gamma-encoded formats without introducing perceptually noticeable artifacts on traditional rendering devices. However, in an effort to record more precise and livelier imagery, novel High Dynamic Range (HDR) image sensors that are from their claims capable of recording dynamic ranges of even up to 6 orders of magnitude have been developed. Moreover, most special effects, computer graphics enhancement and other post-production work are already routinely conducted at higher bit depths, making the visual universes created on a computer potentially infinite.

Furthermore, the contrast and peak luminance of state-of-the-art display systems continues to increase. Recently, new prototype displays have been presented with a peak luminance as high as 5000 $Cd/m^{-2}$ and theoretical contrast ratios of 5 orders of magnitude. When traditionally encoded 8-bit signals are displayed on such displays, annoying quantization and clipping artifacts may appear, and furthermore, the limited information in 8 bit signals is in general insufficient to create the complex image—as to distribution of grey values—which may faithfully be rendered with these devices. In particular, traditional video formats offer insufficient headroom and accuracy to convey the rich information contained in new HDR imagery.

As a result, there is a growing need for new video formats that allow a consumer to fully benefit from the capabilities of state-of-the-art sensors and display systems. Preferably, such formats are backwards-compatible such that legacy equipment can still receive ordinary video streams, while new HDR-enabled devices take full advantage of the additional information conveyed by the new format. Thus, it is desirable that encoded video data not only represents the HDR images but also allow encoding of traditional Low Dynamic Range (LDR) images that can be displayed on conventional equipment.

The most straightforward approach would be to compress and store LDR and HDR streams independently of each-other (simulcast). However, this would result in a high data rate. In order to improve the compression efficiency, it has been proposed to employ inter-layer prediction where HDR data is predicted from an LDR stream, such that only the smaller differences between the actual HDR data and its prediction need to be encoded and stored/transmitted.

However, prediction of HDR from LDR data tends to be difficult and relatively inaccurate. Indeed, the relationship between corresponding LDR and HDR tends to be very complex and may often vary strongly between different parts of the image. For example, an LDR image may often be generated by tone mapping and color grading of an HDR image. The exact tone mapping/color grading, and thus the relationship between the HDR and LDR images will depend on the specific algorithm and parameters chosen for the color grading and is thus likely to vary depending on the source. Indeed, color grading may often be subjectively and individually modified not only for different content items but also between different images and indeed very often between different parts of an image. For example, a color grader may select different objects in an image and apply separate and individual color grading to each object. Consequently, prediction of HDR images from LDR images is typically very difficult and ideally requires adaptation to the specific approach used to generate the LDR image from the HDR image.

An example of an approach for predicting an HDR image is presented in Mantiuk, R., Efremov, A., Myszkowski, K., and Seidel, H.2006. Backward compatible high dynamic range MPEG video compression. ACM Trans. Graph. 25, 3 (July 2006), 713-723. In this approach a global reconstruction function is estimated and used to perform the inter-layer prediction. However, the approach tends to result in suboptimal results and tends to be less accurate than desired. In particular, the use of a global reconstruction function tends to allow only a rough estimation as it cannot take into account local variations in the relationship between HDR and LDR data e.g. caused by application of a different color grading Another approach is proposed in US Patent Application US2009/0175338 wherein a mechanism for inter-layer prediction that operates on a macroblock (MB) level is presented. In the approach, the HDR stream is for each macroblock locally predicted by estimating a scale and offset parameter, which corresponds to a linear regression of the macroblock data. However, although this may allow a more local prediction, the simplicity of the linear model applied often fails to accurately describe the intricate relations between LDR and HDR data, particularly in the vicinity of high-contrast and color edges.

Hence, an improved approach for encoding HDR/LDR data and/or for generating HDR data from LDR data would be advantageous. In particular a system allowing for increased flexibility, facilitated implementation and/or operation, improved and/or automated adaptation, increased accuracy, reduced encoding data rates and/or improved performance would be advantageous.

Another important trend recently emerging is that many display devices, whether televisions, gaming monitors, or even mobile devices, are going for rendering at least some form of 3-dimensional information. It may be so that the market at the same time may not want to go for either/or of these quality modalities, i.e. either 3D LDR or 2D HDR, but that on the same low capacity systems (e.g. a bluray disk) one may want to have both quality improvements at the same time.

SUMMARY OF THE INVENTION

Accordingly, the invention seeks to preferably mitigate, alleviate or eliminate one or more of the above mentioned disadvantages singly or in any combination, in particular it seeks to provide options for easily encoding both some HDR information and some 3D information, in particular in an efficient way, which can use existing relationships between different coding qualities of faithfulness representations of a same images scene capturing. It is especially interesting if one can smartly encode by using some similarities between HDR on the one hand, and 3D on the other. In particular, since many current coding technologies rely on predictions of one representation from another (e.g. a higher dynamic range grading from an approximate LDR representation), it is very useful if predictions of 1 such improvement (e.g. HDR) can make use of predictions of the other improvement (additional 3D views additional to a primary view). Not only is it useful if on the one hand very complicated heuristics used in e.g. the 3D module to accurately identify e.g. spatial objects in the scene (and precisely determine their boundaries) may be reused also in the predictions from LDR to HDR (e.g. to apply a local LDR-to-HDR transformation strategy exactly on an accurately determined object), but on the other hand, the additional information derivable from the additional information of one mode (e.g. information derivable from additional views) can be used to make the transformations, e.g. the predictions, of the other mode more easy, faithful, etc. (e.g. a depth map may form useful information for a LDR-to-HDR transformation, or vice versa, if the LDR/HDR encoding strategy contains (meta)data allowing better identification of regions or objects, this may aid the 3 dimensional scene analysis and representation/coding).

According to an aspect of the invention there is provided a method of encoding an input image, the method comprising: receiving the input image; generating a mapping relating input data in the form of input sets of image spatial positions and a combination of color coordinates of low dynamic range pixel values associated with the image spatial positions to output data in the form of high dynamic range pixel values in response to a reference low dynamic range image and a corresponding reference high dynamic range image; and generating an output encoded data stream by encoding the input image in response to the mapping.

The invention may provide an improved encoding. For example, it may allow encoding to be adapted and targeted to specific dynamic range characteristics, and in particular to characteristics associated with dynamic range expansion techniques that may be performed by a suitable decoder. The invention may for example provide an encoding that may allow a decoder to enhance a received encoded low dynamic range image to a high dynamic range image. The use of a mapping based on reference images may in particular in many embodiments allow an automated and/or improved adaptation to image characteristics without requiring predetermined rules or algorithms to be developed and applied for specific image characteristics.

The image positions that may be considered to be associated with the combination may for a specific input set e.g. be determined as the image positions that meet a neighborhood criterion for the image spatial positions for the specific input set. For example, it may include image positions that are less than a given distance from the position of the input set, that belong to the same image object as the position of the input set, that falls within position ranges defined for the input set etc.

The combination may for example be a combination that combines a plurality of color coordinate values into fewer values, and specifically into a single value. For example, the combination may combine color coordinates (such as RGB values) into a single luminance value. As another example, the combination may combine values of neighboring pixels into a single average or differential value. In other embodiments, the combination may alternatively or additionally be a plurality of values. For example, the combination may be a data set comprising a pixel value for each of a plurality of neighboring pixels. Thus, in some embodiments, the combination may correspond to one additional dimension of the mapping (i.e. in addition to the spatial dimensions) and in other embodiments the combination may correspond to a plurality of additional dimensions of the mapping.

A color coordinate may be any value reflecting a visual characteristic of the pixel and may specifically be a luminance value, a chroma value or a chrominance value. The combination may in some embodiments comprise only one pixel value corresponding to an image spatial position for the input set.

The method may include dynamically generating the mapping. For example, a new mapping may be generated for each image of a video sequence or e.g. for each $N^{th}$ image where N is an integer.

In accordance with an optional feature of the invention, the input image is an input high dynamic range image; and the method further comprises: receiving an input low dynamic range image corresponding to the input high dynamic range image; generating a prediction base image from the input low dynamic range image; predicting a predicted high dynamic range image from the prediction base image in response to the mapping; encoding the residual high dynamic range image in response to the predicted high dynamic range image and the input high dynamic range image to generate encoded high dynamic range data; and including the encoded high dynamic range data in the output encoded data stream.

The invention may provide improved encoding of HDR images. In particular, improved prediction of an HDR image from an LDR image may be achieved allowing a reduced residual signal and thus more efficient encoding. A data rate of the enhancement layer, and thus of the combined signal, may be achieved.

The approach may allow prediction to be based on an improved and/or automatic adaptation to the specific relationship between HDR and LDR images. For example, the approach may automatically adapt to reflect the application of different tone mapping and color grading approaches whether for different sources, images or indeed parts of images. For example, the approach may adapt to specific characteristics within individual image objects.

The approach may in many scenarios allow backwards compatibility with existing LDR equipment which may simply use a base layer comprising an LDR encoding of the input image. Furthermore, the approach may allow a low complexity implementation thereby allowing reduced cost, resource requirements and usage, or facilitated design or manufacturing.

The prediction base image may specifically be generated by encoding the input low dynamic range image to generate encoded data; and generating the prediction base image by decoding the encoded data.

The method may comprise generating the output encoded data stream to have a first layer comprising encoded data for the input image and a second layer comprising encoded data for the residual image. The second layer may be an optional layer and specifically the first layer may be a base layer and the second layer may be an enhancement layer.

The encoding of the residual high dynamic range image may specifically comprise generating residual data for at least part of the high dynamic range image by a comparison of the input high dynamic range image and the predicted dynamic range image; and generating at least part of the encoded high dynamic range data by encoding the residual data.

In accordance with an optional feature of the invention, each input set corresponds to a spatial interval for each spatial image dimension and at least one value interval for the combination, and the generation of the mapping comprises for each image position of at least a group of image positions of the reference low dynamic range image: determining at least one matching input set having spatial intervals corresponding to the each image position and a value interval for the combination corresponding to a combination value for the each image position in the reference low dynamic range image; and determining an output high dynamic range pixel value for the matching input set in response to a high dynamic range pixel value for the each image position in the reference high dynamic range image.

This provides an efficient and accurate approach for determining a suitable mapping for dynamic range modification.

In some embodiments, a plurality of matching input sets may be determined for at least a first position of the at least a group of image positions and determining output high dynamic range pixel values for each of the plurality of matching input sets in response to a high dynamic range pixel value for the first position in the mapping high dynamic range image.

In some embodiments the method further comprises determining the output high dynamic range pixel value for a first input set in response to an averaging of contributions from all high dynamic range pixel values for image positions of the at least a group of image positions which match the first input set.

In accordance with an optional feature of the invention, the mapping is at least one of: a spatially subsampled mapping; a temporally subsampled mapping; and a combination value subsampled mapping.

This may in many embodiments provide an improved efficiency and/or reduced data rate or resource requirements while still allowing advantageous operation. The temporal subsampling may comprise updating the mapping for a subset of images of a sequence of images. The combination value subsampling may comprise application of a coarser quantization of one or more values of the combination than resulting from the quantization of the pixel values. The spatial subsampling may comprise each input sets covering a plurality of pixel positions.

In accordance with an optional feature of the invention, the input image is an input high dynamic range image; and the method further comprises: receiving an input low dynamic range image corresponding to the input high dynamic range image; generating a prediction base image from the input low dynamic range image; predicting a predicted high dynamic range image from the prediction base image in response to the mapping; and adapting at least one of the mapping and a residual high dynamic range image for the predicted high dynamic range image in response to a comparison of the input high dynamic range image and the predicted high dynamic range image.

This may allow an improved encoding and may in many embodiments allow the data rate to be adapted to specific image characteristics. For example, the data rate may be reduced to a level required for a given quality level with a dynamic adaptation of the data rate to achieve a variable minimum data rate.

In some embodiments, the adaptation may comprise determining whether to modify part or all of the mapping. For example, if the mapping results in a predicted high dynamic range image which deviates more than a given amount from the input high dynamic range image, the mapping may be partially or fully modified to result in an improved prediction. For example, the adaptation may comprise modifying specific high dynamic range pixel values provided by the mapping for specific input sets.

In some embodiments, the method may include a selection of elements of at least one of mapping data and residual high dynamic range image data to include in the output encoded data stream in response to a comparison of the input high dynamic range image and the predicted high dynamic range image. The mapping data and/or the residual high dynamic range image data may for example be restricted to areas wherein the difference between the input high dynamic range image and the predicted high dynamic range image exceeds a given threshold.

In accordance with an optional feature of the invention, the input image is the reference high dynamic range image and the reference low dynamic range image is an input low dynamic range image corresponding to the input image.

This may in many embodiments allow a highly efficient prediction of a high dynamic range image from an input low dynamic range image, and may in many scenarios provide a particularly efficient encoding of both low and high dynamic range images. The method may further include mapping data characterizing at least part of the mapping in the output encoded data stream.

In accordance with an optional feature of the invention, the input sets for the mapping further comprises depth indications associated with image spatial positions and the mapping further reflects a relationship between depth and high dynamic range pixel values. This may provide an improved mapping and may for example allow the mapping to be used to generate an improved prediction for the input image. The approach may allow a reduced data rate for a given quality level. A depth indication may be any suitable indication of depth in the image including a depth (z direction) value or a disparity value.

In accordance with an optional feature of the invention, the input image corresponds to a high dynamic range first view image of a multi-view image and the method further comprises: encoding a high dynamic range second view image for the multi-view image in response to the high dynamic range first view image.

The approach may allow a particularly efficient encoding of multi-view images and may allow an improved data rate to quality ratio and/or facilitated implementation. The multi-view image may be an image comprising a plurality of images corresponding to different views of the same scene. The multi-view image may specifically be a stereo image comprising a right and left image (e.g corresponding to a viewpoint for the right and left eye of a viewer). The high dynamic range first view image may specifically be used to generate a prediction (or an additional prediction) of the high dynamic range second view image. In some cases, the high dynamic range first view image may be used directly as a prediction for the high dynamic range second view image. The approach may allow for a highly efficient joint/combined encoding of LDR/HDR multi-view images. The high dynamic range image may specifically be the high dynamic range first view image.

In accordance with an optional feature of the invention, the high dynamic range first view image and the high dynamic range second view image are jointly encoded with the high dynamic range first view image being encoded without being dependent on the high dynamic range second view image and the high dynamic range second view image being encoded using data from the high dynamic range first view image, the encoded data being split into separate data streams including a primary data stream comprising data for the high dynamic range first view image and a secondary bitstream comprising data for the high dynamic range second view image, wherein the primary and secondary bitstreams are multiplexed into the output encoded data stream with data for the primary and secondary data streams being provided with separate codes.

This may provide a particularly efficient encoding of a data stream of multi-view images which may allow improved backwards compatibility. The approach may combine advantages of joint encoding of multi-view HDR images with backwards compatibility allowing non-fully capable decoders to efficiently decode single view images.

In accordance with an optional feature of the invention, an encoding module comprises an image data input for receiving image data for an image to be encoded, a prediction input for receiving a prediction for the image to be encoded, and a data output for outputting encoding data for the image to be encoded, the encoding module being operable to generate the encoding data from the prediction and the image data; and encoding the high dynamic range first view image is performed by the encoding module when receiving a prediction generated from the mapping on the prediction input and image data for the high dynamic range image on the image data input, and encoding of the high dynamic range second view image is performed by the encoding module when receiving a prediction generated from the high dynamic range first view image on the prediction input and image data for the high dynamic range second view image on the image data input.

This may allow a particularly efficient and/or low complexity encoding. The encoding module may advantageously be reused for different functionality. The encoding module may for example be an H264 single view encoding module.

In accordance with an aspect of the invention, there is provided method of generating a high dynamic range image from a low dynamic range image, the method comprising: receiving the low dynamic range image; providing a mapping relating input data in the form of input sets of image spatial positions and a combination of color coordinates of low dynamic range pixel values associated with the image spatial positions to output data in the form of high dynamic range pixel values, the mapping reflecting a dynamic range relationship between a reference low dynamic range image and a corresponding reference high dynamic range image; and generating the high dynamic range image in response to the low dynamic range image and the mapping.

The invention may allow a particularly efficient approach for generating a high dynamic range image from a low dynamic range image.

The method may specifically be a method of decoding a high dynamic range image. The low dynamic range image may be received as an encoded image which is first decoded after which the mapping is applied to the decoded low dynamic range image to provide a high dynamic range image. Specifically, the low dynamic range image may be generated by decoding a base layer image of an encoded data stream.

The reference low dynamic range image and a corresponding reference high dynamic range may specifically be previously decoded images. In some embodiments, the low dynamic range image may be received in an encoded data stream which may also comprise data characterizing or identifying the mapping and/or one or both of the reference images.

In accordance with an optional feature of the invention, generating the high dynamic range image comprises determining at least part of a predicted high dynamic range image by for each position of at least part of the predicted dynamic range image: determining at least one matching input set matching the each position and a first combination of color coordinates of low dynamic range pixel values associated with the each position; retrieving from the mapping at least one output high dynamic range pixel value for the at least one matching input set; determining a high dynamic range pixel value for the each position in the predicted high dynamic range image in response to the at least one output high dynamic range pixel value; and determining the high dynamic range image in response to the at least part of the predicted high dynamic range image.

This may provide a particularly advantageous generation of a high dynamic range image. In many embodiments, the approach may allow a particularly efficient encoding of both low and high dynamic range images. In particular, an accurate, automatically adapting and/or efficient generation of a prediction of a high dynamic range image from a low dynamic range image can be achieved.

The generation of the high dynamic range image in response to the at least part of the predicted high dynamic range image may comprise using the at least part of the predicted high dynamic range image directly or may e.g. comprise enhancing the at least part of the predicted high dynamic range image using residual high dynamic range data, which e.g. may be comprised in a different layer of an encoded signal than a layer comprising the low dynamic range image.

In accordance with an optional feature of the invention, the low dynamic range image is an image of a low dynamic range video sequence and the method comprises generating the mapping using a previous low dynamic range image of the low dynamic range video sequence as the reference low dynamic range image and a previous high dynamic range image generated for the previous low dynamic range image as the reference high dynamic range image.

This may allow an efficient operation and may in particular allow efficient encoding of video sequences with corresponding low and high dynamic range images. For example, the approach may allow an accurate encoding based on a prediction of at least part of a high dynamic range image from a low dynamic range image without requiring any information of the applied mapping to be communicated between the encoder and decoder.

In accordance with an optional feature of the invention, the previous high dynamic range image is further generated in response to residual image data for the previous low dynamic range image relative to predicted image data for the previous low dynamic range image.

This may provide a particularly accurate mapping and thus improved prediction.

In accordance with an optional feature of the invention, the low dynamic range image is an image of a low dynamic range video sequence, and the method further comprises using a nominal mapping for at least some low dynamic range images of the low dynamic range video sequence.

This may allow particularly efficient encoding for many images and may in particular allow an efficient adaptation to different images of a video sequence. For example, a nominal mapping may be used for images for which no suitable reference images exist, such as e.g. the first image following a scene change.

In some embodiments, the dynamic range video sequence may be received as part of an encoded video signal which further comprises a reference mapping indication for the low dynamic range images for which the reference mapping is used. In some embodiments, the reference mapping indication is indicative of an applied reference mapping selected from a predetermined set of reference mappings. For example, N reference mappings may be predetermined between an encoder and decoder and the encoding may include an indication of which of the reference mappings should be used for the specific image by the decoder.

In accordance with an optional feature of the invention, the combination is indicative of at least one of a texture, gradient, and spatial pixel value variation for the image spatial positions.

This may provide a particularly advantageous generation of a high dynamic range image, and may in particular generate more appealing high dynamic range images.

In accordance with an optional feature of the invention, the input sets for the mapping further comprises depth indications associated with image spatial positions, and the mapping further reflects a relationship between depth and high dynamic range pixel values. This may provide an improved mapping and may for example allow the mapping to be used to generate an improved prediction of the high dynamic range image. The approach may e.g. allow a reduced data rate for a given quality level. A depth indication may be any suitable indication of depth in the image including a depth (z direction) value or a disparity value.

In accordance with an optional feature of the invention, the high dynamic range image corresponds to a first view image of a multi-view image and the method further comprises: generating a high dynamic range second view image for the multi-view image in response to the high dynamic range image.

The approach may allow a particularly efficient generation/decoding of multi-view images and may allow an improved data rate to quality ratio and/or facilitated implementation. The multi-view image may be an image comprising a plurality of images corresponding to different views of the same scene. The multi-view image may specifically be a stereo image comprising a right and left image (e.g corresponding to a viewpoint for the right and left eye of a viewer). The high dynamic range first view image may specifically be used to generate a prediction of the high dynamic range second view image. In some cases, the high dynamic range first view image may be used directly as a prediction for the high dynamic range second view image. The approach may allow for a highly efficient joint/combined decoding of LDR/HDR multi-view images.

In accordance with an optional feature of the invention, a decoding module comprises an encoder data input for receiving encoded data for an encoded image, a prediction input for receiving a prediction image for the encoded image, and a data output for outputting a decoded image, the decoding module being operable to generate the decoded image from the prediction image and the encoder data; and wherein generating the high dynamic range image is performed by the decoding module when receiving a prediction generated from the mapping on the prediction input and residual image data for the high dynamic range image on the encoder data input, and generating the high dynamic range second view image is performed by the decoding module when receiving a prediction image generated from the high dynamic range image on the prediction input and residual image data for the high dynamic range second view image on the encoder data input.

This may allow a particularly efficient and/or low complexity decoding. The decoding module may advantageously be reused for different functionality. The decoding module may for example be an H264 single view decoding module.

In accordance with an optional feature of the invention, the decoding module comprises a plurality of prediction image memories arranged to store prediction images generated from previous decoded images; and the decoding module overwrites one of the prediction image memories with the prediction image received on the prediction input.

This may allow a particularly efficient implementation and/or operation.

In accordance with an optional feature of the invention, the step of generating the high dynamic range second view image comprises: providing a mapping relating input data in the form of input sets of image spatial positions and a combination of color coordinates of high dynamic range pixel values associated with the image spatial positions to output data in the form of high dynamic range pixel values, the mapping reflecting a relationship between a reference high dynamic range image for the first view and a corresponding reference high dynamic range image for the second view; and generating the high dynamic range second view image in response to the high dynamic range image and the mapping.

This may provide a particularly advantageous approach to generating the dynamic range second view image based on the high dynamic range first view image. In particularly, it may allow an accurate mapping or prediction which is based on reference images. The generation of the high dynamic range second view image may be based on an automatic generation of a mapping and may e.g. be based on a previous high dynamic range second view image and a previous high dynamic range first view image. The approach may e.g. allow the mapping to be generated independently at an encoder and decoder side and thus allows efficient encoder/decoder prediction based on the mapping without necessitating any additional mapping data being communicated from the encoder to the decoder.

According to an aspect of the invention there is provided a device for encoding an input image, the device comprising: a receiver for receiving the input image; a mapping generator for generating a mapping relating input data in the form of input sets of image spatial positions and a combination of color coordinates of low dynamic range pixel values associated with the image spatial positions to output data in the form of high dynamic range pixel values in response to a reference low dynamic range image and a corresponding reference high dynamic range image; and an output processor for generating an output encoded data stream by encoding the input image in response to the mapping. The device may for example be an integrated circuit or part thereof.

According to an aspect of the invention there is provided an apparatus comprising: the device of the previous paragraph; input connection means for receiving a signal comprising the input image and feeding it to the device; and output connection means for outputting the output encoded data stream from the device.

According to an aspect of the invention there is provided a device for generating a high dynamic range image from a low dynamic range image, the method comprising: a receiver for receiving the low dynamic range image; a mapping processor for providing a mapping relating input data in the form of input sets of image spatial positions and a combination of color coordinates of low dynamic range pixel values associated with the image spatial positions to output data in the form of high dynamic range pixel values, the mapping reflecting a dynamic range relationship between a reference low dynamic range image and a corresponding reference high dynamic range image; and an image generator for generating the high dynamic range image in response to the low dynamic range image and the mapping. The device may for example be an integrated circuit or part thereof.

According to an aspect of the invention there is provided an apparatus comprising the device of the previous paragraph; input connection means for receiving the low dynamic range image and feeding it to the device; output connection means for outputting a signal comprising the high dynamic range image from the device. The apparatus may for example be a set-top box, a television, a computer monitor or other display, a media player, a DVD or BluRay™ player etc.

According to an aspect of the invention there is provided an encoded signal comprising: an encoded low dynamic range image; and residual image data for the low dynamic range image, at least part of the residual image data being indicative of a difference between a desired high dynamic range image corresponding to the low dynamic range image and a predicted high dynamic range image resulting from application of a mapping to the encoded low dynamic range image, where the mapping relates input data in the form of input sets of image spatial positions and a combination of color coordinates of low dynamic range pixel values associated with the image spatial positions to output data in the form of high dynamic range pixel values, the mapping reflecting a dynamic range relationship between a reference low dynamic range image and a corresponding reference high dynamic range image.

According to a feature of the invention there is provided a storage medium comprising the encoded signal of the previous paragraph. The storage medium may for example be a data carrier such as a DVD or BluRay™ disc.

A computer program product for executing the method of any of the aspects or features of the invention may be provided. Also, storage medium comprising executable code for executing the method of any of the aspects or features of the invention may be provided.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to encoding and decoding of corresponding low dynamic range and high dynamic range images of video sequences. However, it will be appreciated that the invention is not limited to this application and that the described principles may be applied in many other scenarios and may e.g. be applied to enhance or modify dynamic ranges of a large variety of images.

Figure 1:
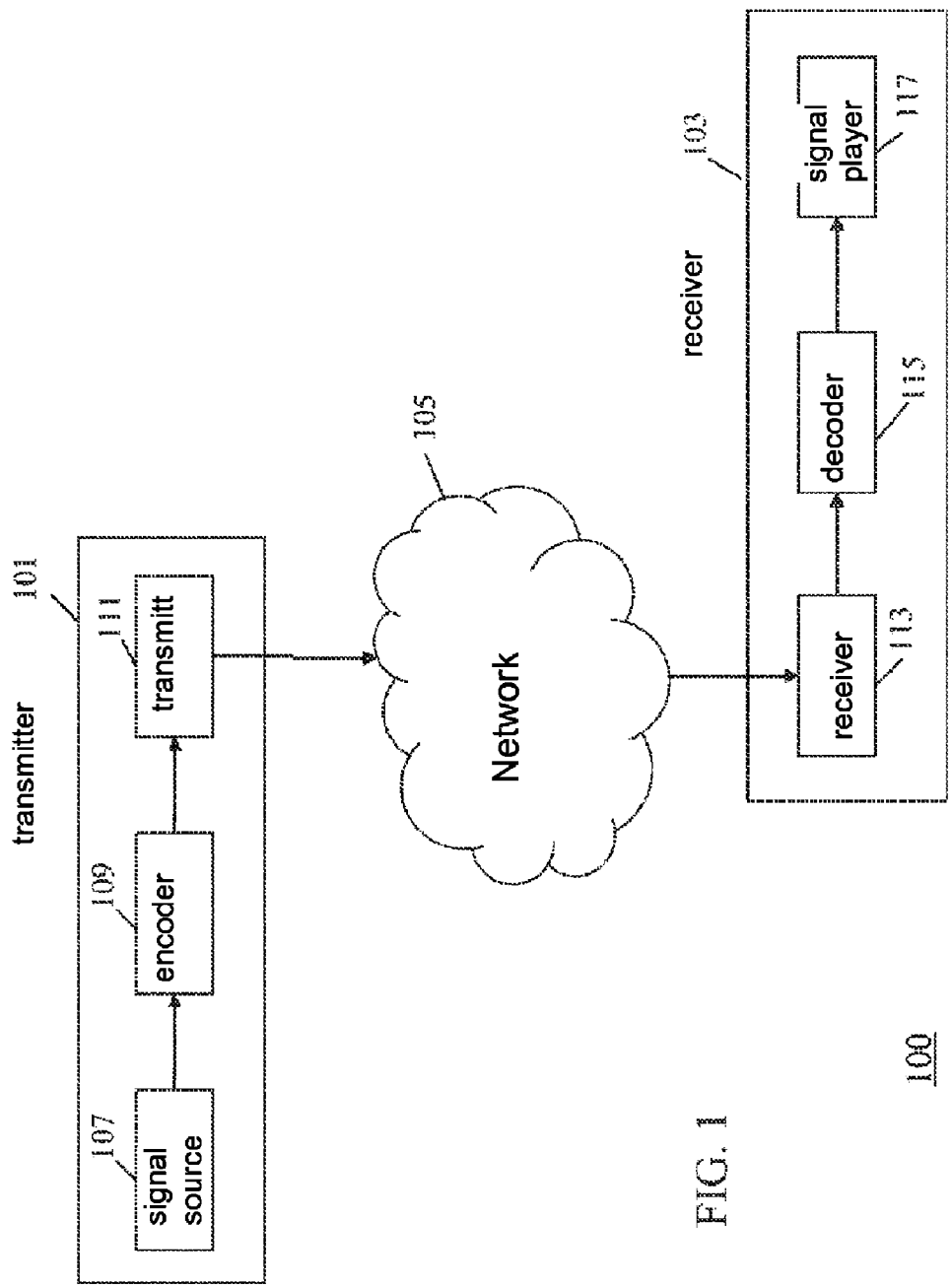
FIG. 1 is an illustration of an example of a transmission system in accordance with some embodiments of the invention.

FIG. 1 illustrates a transmission system 100 for communication of a video signal in accordance with some embodiments of the invention. The transmission system 100 comprises a transmitter 101 which is coupled to a receiver 103 through a network 105 which specifically may be the Internet or e.g. a broadcast system such as a digital television broadcast system.

In the specific example, the receiver 103 is a signal player device but it will be appreciated that in other embodiments the receiver may be used in other applications and for other purposes. In the particular example, the receiver 103 may be a display, such as a television, or may be a set top box for generating a display output signal for an external display such as a computer monitor or a television.

In the specific example, the transmitter 101 comprises a signal source 107 which provides a video sequence of low dynamic range images and a corresponding video sequence of high dynamic range images. Corresponding images represent the same scene/image but with different dynamic ranges. Typically, the low dynamic range image may be generated from the corresponding high dynamic range image by a suitable color grading that may have been performed automatically, semi-automatically or manually. In some embodiments, the high dynamic range image may be generated from the low dynamic range image, or they may be generated in parallel, such as e.g. for computer generated images.

It will be appreciated that the term low dynamic range image and high dynamic range image do not specify any specific absolute dynamic ranges for the images but are merely relative terms that relate the images to each other such that a high dynamic range image has a (potentially) higher dynamic range than the lower dynamic range image.

The signal source 107 may itself generate the low dynamic range image, the high dynamic range image or both the low and high dynamic range images or may e.g. receive one or both of these from an external source.

The signal source 107 is coupled the encoder 109 which proceeds to encode the high and low dynamic range video sequences in accordance with an encoding algorithm that will be described in detail later. The encoder 109 is coupled to a network transmitter 111 which receives the encoded signal and interfaces to the communication network 105. The network transmitter may transmit the encoded signal to the receiver 103 through the communication network 105. It will be appreciated that in many other embodiments, other distribution or communication networks may be used, such as e.g. a terrestrial or satellite broadcast system.

The receiver 103 comprises a receiver 113 which interfaces to the communication network 105 and which receives the encoded signal from the transmitter 101. In some embodiments, the receiver 113 may for example be an Internet interface, or a wireless or satellite receiver.

The receiver 113 is coupled to a decoder 115. The decoder 115 is fed the received encoded signal and it then proceeds to decode it in accordance with a decoding algorithm that will be described in detail later. The decoder 115 may specifically generate a high dynamic range video sequence from the received encoded data.

In the specific example where a signal playing function is supported, the receiver 103 further comprises a signal player 117 which receives the decoded video signal from the decoder 115 and presents this to the user using suitable functionality. Specifically, the signal player 117 may itself comprise a display that can present the encoded video sequence. Alternatively or additionally, the signal player 117 may comprise an output circuit that can generate a suitable drive signal for an external display apparatus. Thus, the receiver 103 may comprise an input connection means receiving the encoded video sequence and an output connection means providing an output drive signal for a display.

Figure 2:
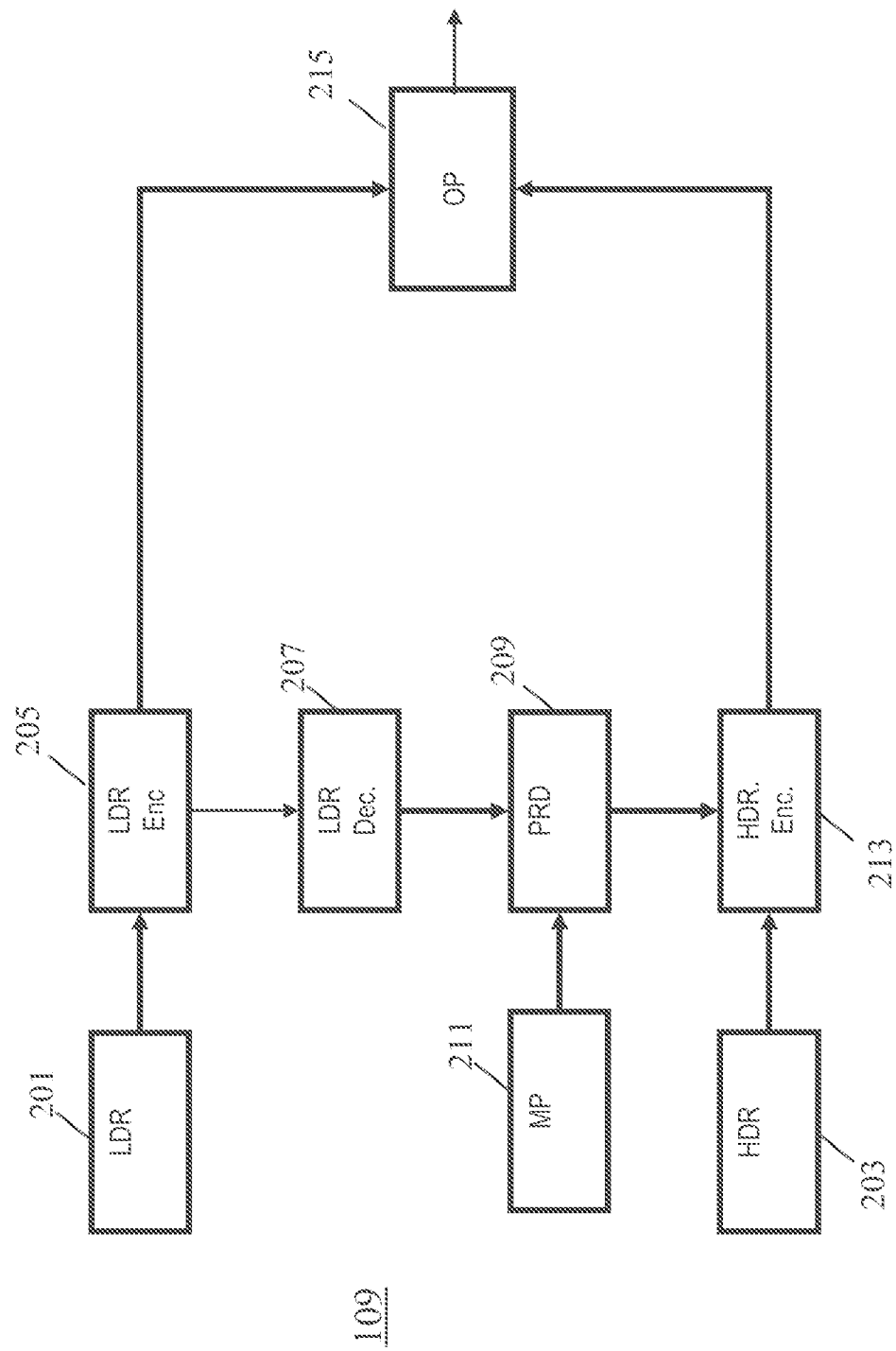
FIG. 2 is an illustration of an example of an encoder in accordance with some embodiments of the invention.
Figure 3:
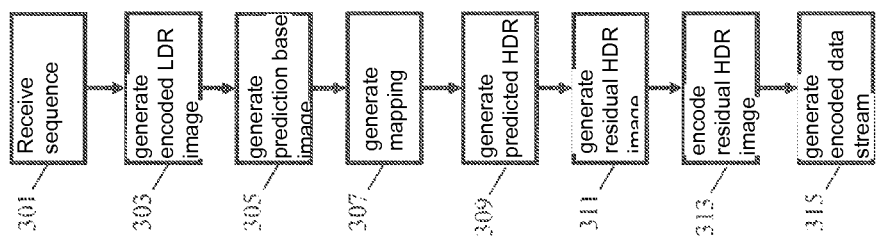
FIG. 3 is an illustration of an example of a method of encoding in accordance with some embodiments of the invention.

FIG. 2 illustrates an example of the encoder 109 in accordance with some embodiments of the invention. FIG. 3 illustrates an example of a method of encoding in accordance with some embodiments of the invention.

The encoder comprises a receiver 201 for receiving a video sequence of the low dynamic range images (which may be derived e.g. in the same unit which contains the encoder on the basis of the available HDR image, or supplied from a separate input, e.g. a separate grading, e.g. an LDR version stored on hard-disk from a television recording etc.), henceforth referred to as the LDR images, and a receiver 203 for receiving a corresponding video sequence of high dynamic range images, henceforth referred to as the HDR images.

Initially the encoder 109 performs step 301 wherein an input LDR image of the LDR video sequence is received. The LDR images are fed to an LDR encoder 205 which encodes the video images from the LDR video sequence. It will be appreciated that any suitable video or image encoding algorithm may be used and that the encoding may specifically include motion compensation, quantization, transform conversion etc as will be known to the skilled person. Specifically, the LDR encoder 205 may be a H-264/AVC standard encoder.

Thus, step 301 is followed by step 303 wherein the input LDR image is encoded to generate an encoded LDR image.

The encoder 109 then proceeds to generate a predicted HDR image from the LDR image. The prediction is based on a prediction base image which may for example be the input LDR image itself. However, in many embodiments the prediction base image may be generated to correspond to the LDR image that can be generated by the decoder by decoding the encoded LDR image.

In the example of FIG. 2, the LDR encoder 205 is accordingly coupled to an LDR decoder 207 which proceeds to generate the prediction base image by a decoding of encoded data of the LDR image. The decoding may be of the actual output data stream or may be of an intermediate data stream, such as e.g. of the encoded data stream prior to a final non-lossy entropy coding. Thus, the LDR decoder 207 performs step 305 wherein the prediction base image is generated by decoding the encoded LDR image.

The LDR decoder 207 is coupled to a predictor 209 which proceeds to generate a predicted HDR image from the prediction base image. The prediction is based on a mapping provided by a mapping processor 211.

Thus, in the example, step 305 is followed by step 307 wherein the mapping is generated and subsequently step 309 wherein the prediction is performed to generate the predicted HDR image.

The predictor 209 is further coupled to an HDR encoder 213 which is further coupled to the HDR receiver 203. The HDR encoder 213 receives the input HDR image and the predicted HDR image and proceeds to encode the input HDR image based on the predicted HDR image.

In detail below for elucidation which we describe as a specific low complexity example, the encoding of the HDR image may be based on generating a residual HDR image relative to the predicted HDR image and encoding the residual HDR image. However the skilled person will understand that the prediction strategies for LDR/HDR encoding in conjunction with 3D (stereo or several pictures) encoding as conforming with the several embodiments described herein will work with several prediction strategies, e.g. one may use local complex transformation functions on objects (whether they are encoded as algorithms, LUTs, or (intermediate or finally usable) images etc.), spatiotemporal modifications of the LDR picture over several pictures, etc. Thus, in such a low complexity example, the HDR encoder 213 may proceed to perform step 311 wherein a residual HDR image is generated in response to a comparison between the input HDR image and the predicted HDR image. Specifically, the HDR encoder 213 may generate the residual HDR image by subtracting the predicted HDR image from the input HDR image. Thus, the residual HDR image represents the error between the input HDR image and that which is predicted based on the corresponding (encoded) LDR image. In other embodiments, other comparisons may be made. For example, a division of the HDR image by the predicted HDR image may be employed.

The HDR encoder 213 may then perform step 313 wherein the residual image is encoded to generate encoded residual data.

It will be appreciated that any suitable encoding principle or algorithm for encoding the residual image may be used. Indeed, in many embodiments the predicted HDR image may be used as one possible prediction out of several. Thus, in some embodiments the HDR encoder 213 may be arranged to select between a plurality of predictions including the predicted HDR image. Other predictions may include spatial or temporal predictions. The selection may be based on an accuracy measure for the different predictions, such as on an amount of residual relative to the HDP input image. The selection may be performed for the whole image or may for example be performed individually for different areas or regions of the HDR image.

For example, the HDR encoder may be an H264 encoder. A conventional H264 encoder may utilize different predictions such as a temporal predication (between frames, e.g. motion compensation) or spatial prediction (i.e. predicting one area of the image from another). In the approach of FIG. 2, such predictions may be supplemented by the LDR to HDR image prediction. The H.264 based encoder then proceeds to select between the different possible predictions. This selection is performed on a macroblock basis and is based on selecting the prediction that results in the lowest residual for that macroblock. Specifically, a rate distortion analysis may be performed to select the best prediction approaches for each macroblock. Thus, a local decision is made.

Accordingly, the H264 based encoder may use different prediction approaches for different macroblocks. For each macroblock the residual data may be generated and encoded. Thus, the encoded data for the input HDR image may comprise residual data for each macroblock resulting from the specific selected prediction for that macroblock. In addition, the encoded data may comprise an indication of which prediction approach is used for each individual macroblock.

Thus, the LDR to HDR prediction may provide an additional possible prediction that can be selected by the encoder. For some macroblocks, this prediction may result in a lower residual than other predictions and accordingly it will be selected for this macroblock. The resulting residual image for that block will then represent the difference between the input HDR image and the predicted HDR image for that block.

The encoder may in the example use a selection between the different prediction approaches rather than a combination of these, since this would result in the different predictions typically interfering with each other.

The LDR encoder 205 and the HDR encoder 213 are coupled to an output processor 215 which receives the encoded LDR data and the encoded residual data. The output processor 215 then proceeds to perform step 315 wherein an output encoded data stream is generated to include the encoded LDR data and the encoded residual data.

In the example, the generated output encoded data stream is a layered data stream and the encoded LDR data is included in a first layer with the encoded residual data being included in a second layer. The second layer may specifically be an optional layer that can be discarded by decoders or devices that are not compatible with the HDR processing. Thus, the first layer may be a base layer with the second layer being an optional layer, and specifically the second layer may be an enhancement or optional dynamic range modification layer. Such an approach may allow backwards compatibility while allowing HDR capable equipment to utilize the additional HDR information. Furthermore, the use of prediction and residual image encoding allows a highly efficient encoding with a low data rate for a given image quality.

In the example of FIG. 2, the prediction of the HDR image is based on a mapping. The mapping is arranged to map from input data in the form of input sets of image spatial positions and a combination of color coordinates of low dynamic range pixel values associated with the image spatial positions to output data in the form of high dynamic range pixel values.

Thus a mapping, which specifically may be implemented as a look-up-table, is based on input data which is defined by a number of parameters organized in input sets. Thus, the input sets may be considered to be multi-dimensional sets that comprise values for a number of parameters. The parameters include spatial dimensions and specifically may comprise a two dimensional image position, such as e.g. a parameter (range) for a horizontal dimension and a parameter (range) for a vertical dimension. Specifically, the mapping may divide the image area into a plurality of spatial blocks with a given horizontal and vertical extension.

For each spatial block, the mapping may then comprise one or more parameters generated from color coordinates of low dynamic range pixel values. As a simple example, each input set may include a single luminance value in addition to the spatial parameters. Thus, in this case each input set is a three dimensional set with two spatial and one luminance parameters.

For the various possible input sets, the mapping provides an output high dynamic range pixel value. Thus, the mapping may in the specific example be a mapping from three dimensional input data to a single high dynamic range pixel value.

The mapping thus provides both a spatial and color component (including a luminance only component) dependent mapping to a suitable high dynamic range pixel value.

The mapping processor 211 is arranged to generate the mapping in response to a reference low dynamic range image and a corresponding reference high dynamic range image. Thus, the mapping is not a predetermined or fixed mapping but is rather a mapping that may be automatically and flexibly generated/updated based on reference images.

The reference images may specifically be images from the video sequences. Thus, the mapping is dynamically generated from images of the video sequence thereby providing an automated adaptation of the mapping to the specific images.

As a specific example, the mapping may be based on the actual LDR and corresponding HDR image that are being encoded. In this example, the mapping may be generated to reflect a spatial and color component relationship between the input LDR and the input HDR images.

As a specific example, the mapping may be generated as a three dimensional grid of NX×NY×NI bins (input sets). Such a grid approach provides a lot of flexibility in terms of the degree of quantization applied to the three dimensions. In the example, the third (non-spatial) dimension is an intensity parameter which simply corresponds to a luminance value. In the examples below, the prediction of the HDR image is performed at macro-block level and with $2^8$ intensity bins (i.e. using 8 bit values). For a High Definition image this means that the grid has dimensions of: 120×68×256 bins. Each of the bins corresponds to an input set for the mapping.

For each LDR input pixel at position (x,y) in the reference images and intensities $V_{LDR}$ and $V_{HDR}$ for the LDR and HDR image respectively for the color component under consideration (e.g. if each colour component is considered separately), the matching bin for position and intensity is first identified.

In the example, each bin corresponds to a spatial horizontal interval, a spatial vertical interval and an intensity interval. The matching bin (i.e. input set) may be determined by means of nearest neighbor interpolation:

$$I_x = [x/s_x],$$

$$I_y = [y/s_y],$$

$$I_I = [V_{LDR}/s_I],$$

where $I_x$, $I_y$ and $I_I$ are the grid coordinates in the horizontal, vertical and intensity directions, respectively, $s_x$, $s_y$ and $s_I$ are the grid spacings (interval lengths) along these dimensions and [ ] denotes the closest integer operator.

Thus, in the example the mapping processor 211 determines a matching input set/bin that has spatial intervals corresponding to the each image position for the pixel and an interval of the intensity value interval that corresponds to the intensity value for the pixel in the reference low dynamic range image at the specific position.

The mapping processor 211 then proceeds to determine an output high dynamic range pixel value for the matching input set/bin in response to a high dynamic range pixel value for the position in the reference HDR image.

Specifically, during the construction of the grid, both an intensity value D and a weight value W are updated for each new position considered:

$$D(I_x,I_y,I_I)=D(I_x,I_y,I_I)+V_{HDR}(x,y),$$

$$W(I_x,I_y,I_I)=W(I_x,I_y,I_I)+1.$$

After all pixels of the images have been evaluated, the intensity value is normalized by the weight value to result in the output HDR value B for the bin:

$$B=D/W,$$

where the data value B for each value contains an output HDR pixel value corresponding to the position and input intensity for the specific bin/input set. Thus, the position within the grid is determined by the reference LDR image whereas the data stored in the grid corresponds to the reference HDR image. Thus, the mapping input sets are determined from the reference LDR image and the mapping output data is determined from the reference HDR image. In the specific example, the stored output HDR value is an average of the HDR value of pixels falling within the input set/bin but it will be appreciated that in other embodiments, other and in particular more advanced approaches may be used.

In the example, the mapping is automatically generated to reflect the spatial and pixel value relationships between the reference LDR and HDR images. This is particularly useful for prediction of the HDR image from the LDR image when the reference images are closely correlated with the LDR and HDR images being encoded. This may particularly be the case if the reference images are indeed the same images as those being encoded. In this case, a mapping is generated which automatically adapts to the specific relationships between the input LDR and HDR images. Thus, whereas the relationship between these images typically cannot be known in advance, the described approach automatically adapts to the relationship without any prior information. This allows an accurate prediction which results in fewer differences relative to the input HDR image, and thus in a residual image that can be encoded more effectively.

In embodiments where the input images being encoded are directly used to generate the mapping, these images will generally not be available at the decoder end. Therefore, the decoder cannot generate the mapping by itself. Accordingly, in some embodiments, the encoder may further be arranged to include data that characterizes at least part of the mapping in the output encoded stream. For example, in scenarios where fixed and predetermined input set intervals (i.e. fixed bins) are used, the encoder may include all the bin output values in the output encoded stream, e.g. as part of the optional layer. Although this may increase the data rate, it is likely to be a relatively low overhead due to the subsampling performed when generating the grid. Thus, the data reduction achieved from using an accurate and adaptive prediction approach is likely to outweigh any increase in the data rate resulting from the communication of the mapping data.

When generating the predicted image, the predictor 209 may proceed to step through the image one pixel at a time. For each pixel, the spatial position and the intensity value for the pixel in the LDR image is used to identify a specific input set/bin for the mapping. Thus, for each pixel, a bin is selected based on the spatial position and the LDR image value for the pixel. The output HDR pixel value for this input set/bin is then retrieved and may in some embodiments be used directly as the image value for the pixel. However, as this will tend to provide a certain blockiness due to the spatial subsampling of the mapping, the high dynamic range pixel value will in many embodiments be generated by interpolation between output high dynamic range pixel values from a plurality of input bins. For example, the values from neighboring bins (in both the spatial and non-spatial directions) may also be extracted and the pixel value may be generated as an interpolation of these.

Specifically, the predicted HDR image can be constructed by slicing in the grid at the fractional positions dictated by the spatial coordinates and the LDR image:

$$V_{HDR}=F_{int}(B(x/s_x,y/s_y,I/s_I)),$$

where $F_{int}$ denotes an appropriate interpolation operator, such as nearest neighbor or bicubic interpolation.

In many scenarios the images may be represented by a plurality of color components (e.g. RGB or YUV) and the described process may be applied separately of each of the color channels. In particular, the output high dynamic range pixel values may contain one value for each of the color components.

Figure 4:
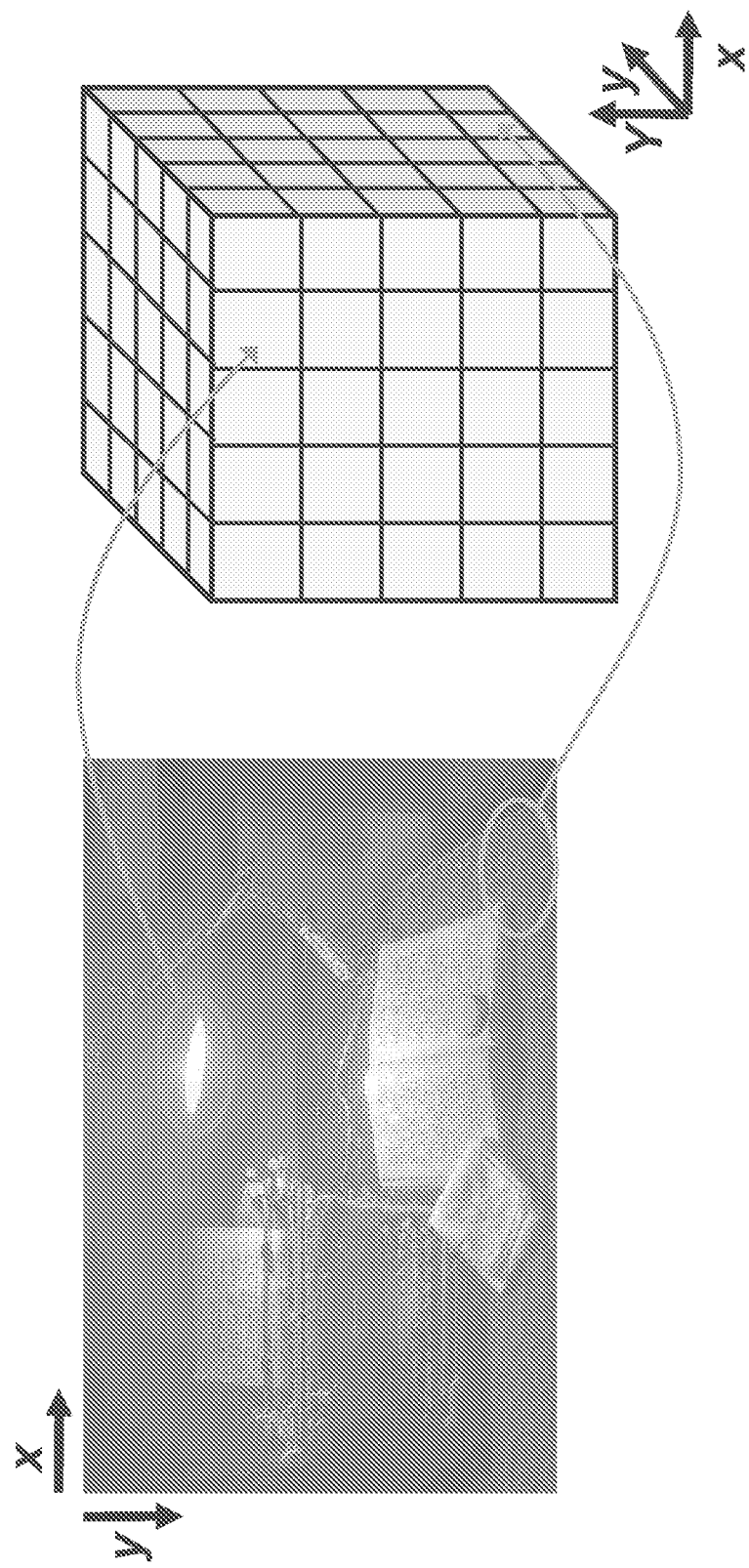
FIGS. 4 and 5 are illustrations of examples of mappings in accordance with some embodiments of the invention.
Figure 5:
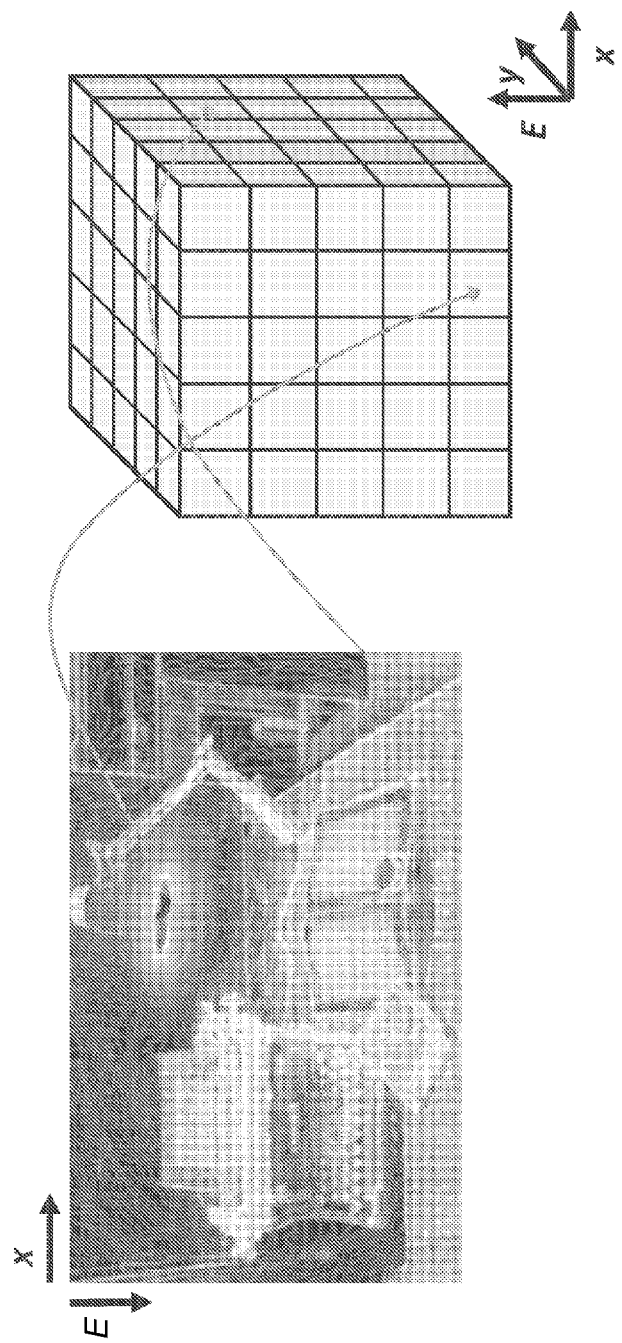

Examples of generation of a mapping are provided in FIGS. 4 and 5. In the examples, the LDR-HDR mapping relation is established using LDR and HDR training images and the position in the mapping table is determined by the horizontal (x) and vertical (y) pixel positions in the image as well as by a combination of LDR pixel values, such as the luminance (Y) in the example of FIG. 4 and the entropy (E) in the example of FIG. 5. As previously described the mapping table stores the associated HDR training data at the specified location. One may make these combinations (typically LUTs) for prediction as complex as one wants, e.g. not just a subsampled (x,y,I_LDR) combination predicts to a V_HDR pixel value (whether I is luminance, or R,G,B, etc.), but an (x,y,I_LDR, furthprops) may be used to map to a V_HDR estimation, where furthprops may contain further image information (one or more further numbers i.e. typically LUT dimensions, which for calculation simplicity may also be embodied e.g. as indices to different LUTs etc.) properties derivable on one or more LDR images, e.g local object or regions characteristic describing parameters, such as a texture estimation, a depth estimate, etc.

The encoder 115 thus generates an encoded signal which comprises the encoded low dynamic range image. This image may specifically be included in a mandatory or base layer of the encoded bitstream. In addition, data is included that allows an efficient generation of an HDR image at the decoder based on the encoded LDR image.

In some embodiments, such data may include or be in the form of mapping data that can be used by the decoder. However, in other embodiments, no such mapping data is included for some or all of the images. Instead, the decoder may itself generate the mapping data from previous images.

The generated encoded signal may further comprise residual image data for the low dynamic range image where the residual image data is indicative of a difference between a desired high dynamic range image corresponding to the low dynamic range image and a predicted high dynamic range image resulting from application of the mapping to the encoded low dynamic range. The desired high dynamic range image is specifically the input HDR image, and thus the residual image data represents data that can modify the decoder generated HDR image to more closely correspond to the desired HDR image, i.e. to the corresponding input HDR image.

The additional residual image data may in many embodiments advantageously be included in an optional layer (e.g. an enhancement layer) that may be used by suitably equipped decoders and ignored by legacy decoders that do not have the required functionality.

The approach may for example allow the described mapping based prediction to be integrated in new backwards-compatible HDR video formats. For example, both layers may be encoded using conventional operations of data transformations (e.g. wavelet, DCT) followed by quantization. Intra- and motion-compensated inter-frame predictions can improve the coding efficiency. In such an approach, inter-layer prediction from LDR to HDR complements the other predictions and further improves the coding efficiency of the enhancement layer.

The signal may specifically be a bit stream that may be distributed or communicated, e.g. over a network as in the example of FIG. 1. In some scenarios, the signal may be stored on a suitable storage medium such as a magneto/optical disc. E.g. the signal may be stored on a DVD or Bluray™ disc.

In the previous example, information of the mapping was included in the output bit stream thereby enabling the decoder to reproduce the prediction based on the received image. In this and other cases, it may be particularly advantageous to use a subsampling of the mapping.

Indeed, a spatial subsampling may advantageously be used such that a separate output value is not stored for each individual pixel but rather is stored for groups of pixels and in particular regions of pixels. In the specific example a separate output value is stored for each macro-block.

Alternatively or additionally, a subsambling of the input non-spatial dimensions may be used. In the specific example, each input set may cover a plurality of possible intensity values in the LDR images thereby reducing the number of possible bins. Such a subsampling may correspond to applying a coarser quantization prior to the generation of the mapping.

Such spatial or value subsampling may substantially reduce the data rate required to communicate the mapping. However, additionally or alternatively it may substantially reduce the resource requirements for the encoder (and corresponding decoder). For example, it may substantially reduce the memory resource required to store the mappings. It may also in many embodiments reduce the processing resource required to generate the mapping.

In the example, the generation of the mapping was based on the current images, i.e. on the LDR and corresponding HDR image being encoded. However, in other embodiments the mapping may be generated using the a previous image of the low dynamic range video sequence as the reference low dynamic range image and a previous high dynamic range image generated for the previous low dynamic range video sequence as the reference high dynamic range image (or in some cases the corresponding previous input HDR image). Thus, in some embodiments, the mapping used for the current image may be based on previous corresponding LDR and HDR images.

As an example the video sequence may comprise a sequence of images of the same scene and accordingly the differences between consecutive images is likely to be low. Therefore, the mapping that is appropriate for one image is highly likely to also be appropriate for the subsequent image. Therefore, a mapping generated using the previous LDR and HDR images as reference images is highly likely to also be applicable to the current image. An advantage of using a mapping for the current image based on a previous image is that the mapping can be independently generated by the decoder as this also has the previous images available (via the decoding of these). Accordingly, no information on the mapping needs to be included, and therefore the data rate of the encoded output stream can be reduced further.

Figure 6:
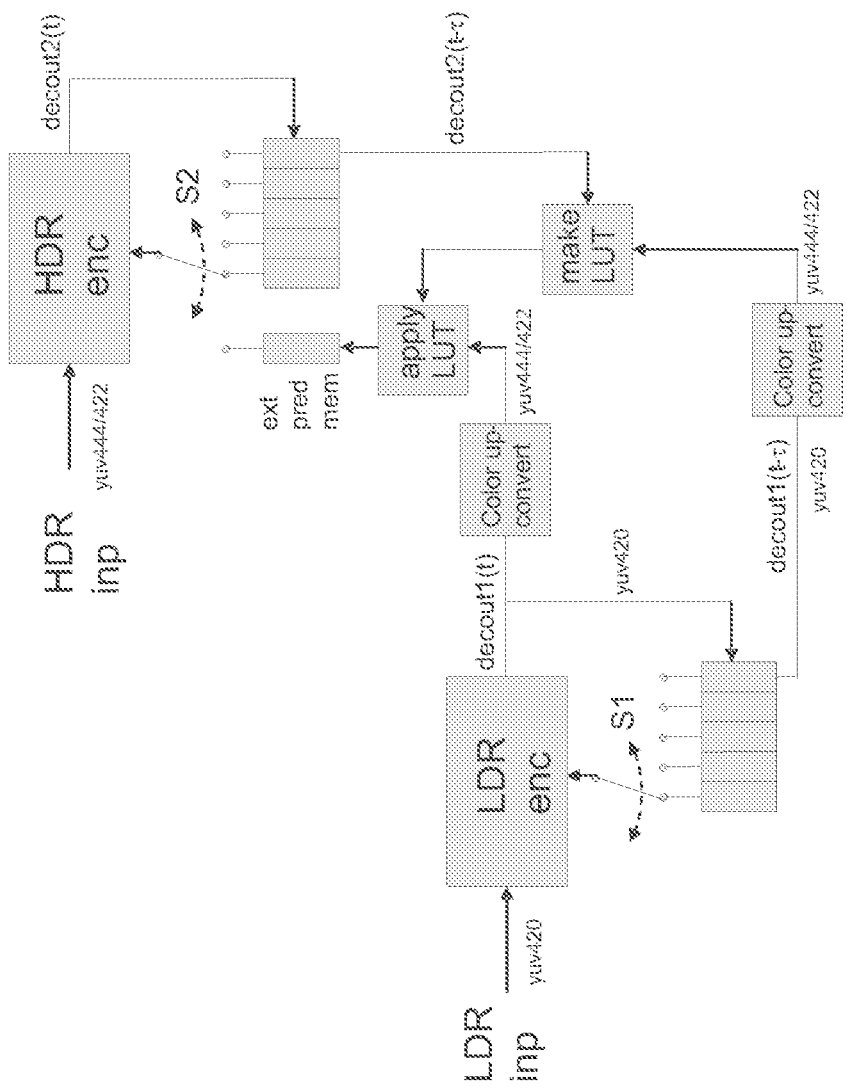
FIG. 6 is an illustration of an example of an encoder in accordance with some embodiments of the invention.

A specific example of an encoder using such an approach is illustrated in FIG. 6. In this example, the mapping (which in the specific example is a Look Up Table, LUT) is constructed on the basis of the previous (delay $\tau$) reconstructed LDR and the previous reconstructed (delay $\tau$) HDR frame both on the encoder and decoder side. In this scenario no mapping values need to be transmitted from the encoder to the decoder. Rather, the decoder merely copies the HDR prediction process using data that is already available to it. Although the quality of the interlayer prediction may be slightly degraded, this will typically be minor because of the high temporal correlation between subsequent frames of a video sequence. In the example, a yuv420 color scheme is used for LDR images and a yuv 444/422 color scheme is used for HDR images (and consequently the generation and application of the LUT (mapping) is preceded by a color up-conversion).

It is preferred to keep the delay $\tau$ as small as possible in order to increase the likelihood that the images are as similar as possible. However, the minimum value may in many embodiments depend on the specific encoding structure used as it requires the decoder to be able to generate the mapping from already decoded pictures. Therefore, the optimal delay may depend on the type of GOP (Group Of Pictures) used and specifically on the temporal prediction (motion compensation) used For example for a IPPPP GOP, $\tau$ can be a single image delay whereas it from a IBPBP GOP will be at least two images.

In the example, each position of the LDR contributed to only one input set/bin of the grid. However, in other embodiments the mapping processor may identify a plurality of matching input sets for at least one position of the at least a group of image positions used to generate the mapping. The output high dynamic range pixel value for all the matching input sets may then be determined in response to the high dynamic range pixel value for the position in the reference high dynamic range image.

Specifically, rather the using nearest neighbor interpolation to build the grid, the individual data can also be spread over neighboring bins rather than just the single best matching bin. In this case, each pixel does not contribute to a single bin but contributes to e.g. all its neighboring bins (8 in the case of a 3D grid). The contribution may e.g. be inversely proportional to the three dimensional distance between the pixel and the neighboring bin centers. Note that some of the temporal offsetted memories may be reused to store other predictions, which may be any as a picture representation any prediction strategy may desire to use. Especially for the HDR encoding part, such a strategy makes this a very versatile unit.

Figure 7:
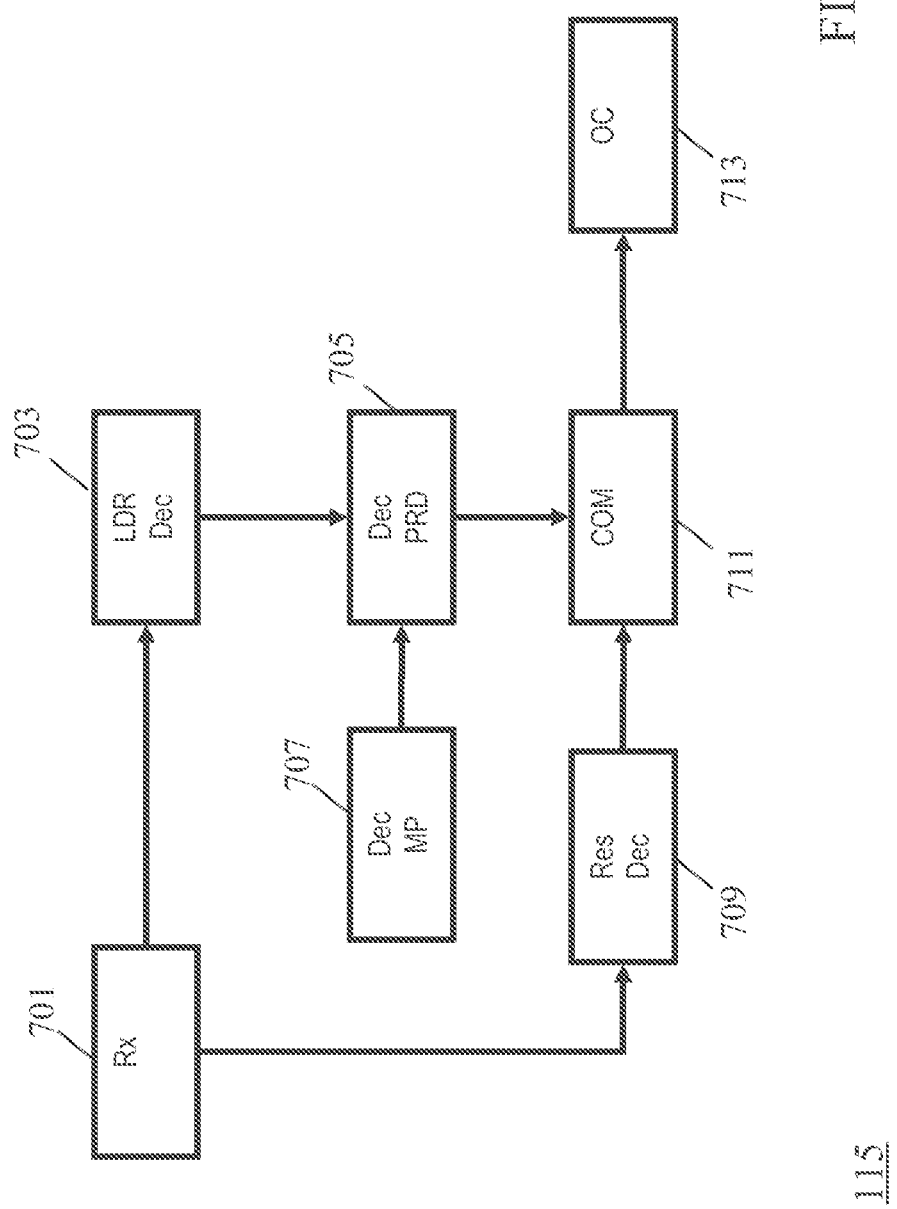
FIG. 7 is an illustration of an example of an encoder in accordance with some embodiments of the invention.
Figure 8:
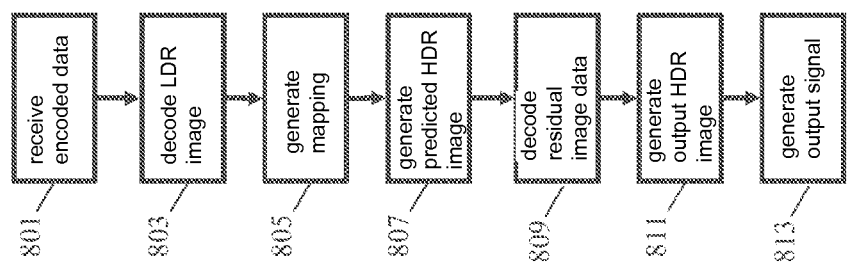
FIG. 8 is an illustration of an example of a method of decoding in accordance with some embodiments of the invention.

FIG. 7 illustrates an example of a complementary decoder 115 to the encoder of FIG. 2 and FIG. 8 illustrates an example of a method of operation therefor.

The decoder 115 comprises a receive circuit 701 which performs step 801 wherein it receives the encoded data from the receiver 113. In the specific example where LDR encoded data and residual data is encoded in different layers, the receive circuit is arranged to extract and demultiplex the LDR encoded data and the optional layer data in the form of the residual image data. In embodiments wherein the information on the mapping is included in the received bitstream, the receive circuit 701 may further extract this data.

The receiver circuit 701 is coupled to an LDR decoder 703 which receives the encoded LDR data. It then proceeds to perform step 803 wherein the LDR image is decoded. He LDR decoder 703 will be complementary to the LDR encoder 205 of the encoder 109 and may specifically be an H-264/AVC standard decoder.

The LDR decoder 703 is coupled to a decode predictor 705 which receives the decoded LDR image. The decode predictor 705 is further coupled to a decode mapping processor 707 which is arranged to perform step 805 wherein a mapping is generated for the decode predictor 705.

The decode mapping processor 707 generates the mapping to correspond to that used by the encoder when generating the residual image data. In some embodiments, the decode mapping processor 707 may simply generate the mapping in response to mapping data received in the encoded data stream. For example, the output data value for each bin of the grid may be provided in the received encoded data stream.

The decode predictor 705 then proceeds to perform step 807 wherein a predicted HDR image is generated from the decoded LDR image and the mapping generated by the decode mapping processor 707. The prediction may follow the same approach as that used in the encoder.

For brevity and clarity, the example will focus on the simplified example wherein the encoder is based only on the LDR to HDR prediction, and thus where an entire LDR to HDR prediction image (and thus an entire residual image) is generated. However, it will be appreciated that in other embodiments, the approach may be used with other prediction approaches, such as temporal or spatial predictions. In particular, it will be appreciated that rather than apply the described approach to the whole image, it may be applied only to image regions or blocks wherein the LDR to HDR prediction was selected by the encoder.

Figure 9:
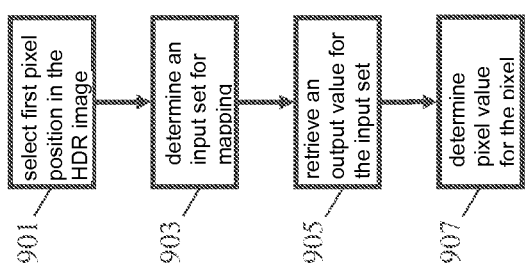
FIG. 9 is an illustration of an example of a prediction of a high dynamic range image in accordance with some embodiments of the invention.

FIG. 9 illustrates a specific example of how a prediction operation may be performed.

In step 901 a first pixel position in the HDR image is selected. For this pixel position an input set for the mapping is then determined in step 903, i.e. a suitable input bin in the grid is determined. This may for example be determined by identifying the grid covering the spatial interval in which the position falls and the intensity interval in which the decoded pixel value of the decoded LDR image falls. Step 903 is then followed by step 905 wherein an output value for the input set is retrieved from the mapping. E.g. a LUT may be addressed using the determined input set data and the resulting output data stored for that addressing is retrieved.

Step 905 is then followed by step 907 wherein the pixel value for the pixel is determined from the retrieved output. As a simple example, the pixel value may be set to the retrieved value. In more complex embodiments, the pixel value may be generated by interpolation of a plurality of output values for different input sets (e.g. considering all neighbor bins as well as the matching bin).

This process may be repeated for all positions in the HDR image and for all color components thereby resulting in a predicted HDR image being generated.

The decoder 115 then proceeds to generate an output HDR image based on the predicted HDR image.

In the specific example, the output HDR image is generated by taking the received residual image data into account. Thus the receive circuit 701 is coupled to a residual decoder 709 which receives the residual image data and which proceeds to perform step 809 wherein the residual image data is decoded to generate a decoded residual image.

The residual decoder 709 is coupled to a combiner 711 which is further coupled to the decode predictor 705. The combiner 711 receives the predicted HDR image and the decoded residual HDR image and proceeds to perform step 811 wherein it combines the two images to generate the output HDR image. Specifically, the combiner may add pixel values for the two images on a pixel by pixel basis to generate the output HDR image.

The combiner 711 is coupled to an output circuit 713 which performs step 813 in which an output signal is generated. The output signal may for example be a display drive signal which can drive a suitable display, such as a television, to present the HDR image.

In the specific example, the mapping was determined on the basis of data included in the encoded data stream. However, in other embodiments, the mapping may be generated in response to previous images that have been received by the decoder, such as e.g. the previous image of the video sequence. For this previous image, the decoder will have an LDR image resulting from the LDR decoding and this may be used as the reference LDR image. In addition, an HDR image has been generated by prediction followed by further correction of the predicted image using the residual image data. Thus, the generated HDR image closely corresponds to the input HDR image of the encoder and may accordingly be used as the reference HDR image. Based on these two reference images, the exact same approach as that used by the encoder may be used to generate a mapping by the decoder. Accordingly, this mapping will correspond to that used by the encoder and will thus result in the same prediction (and thus the residual image data will accurately reflect the difference between the decoder predicted image and the input HDR image at the encoder).

The approach thus provides a backwards compatible HDR encoding starting from a standard LDR encoding, which may e.g. use a "non-optimal" subrange selection of all luminances available in the scene for optimal contrast, via an LDR tone mapping (e.g. a quick rising S-curve with black and white clipping). The approach then adds additional data to allow reconstruction of the optimally encoded HDR image (with potentially another tone mapping for better quality visual effect: e.g. dark grays may be pushed deeper than in the LDR coding).

This may e.g. result in the following differences between HDR and LDR:
    higher precision for the same values (e.g. L=27.5 instead of 27), which could also be recoded with a scale and offset (e.g. 55=2×27.5+0)
    encoding of white and black subpictures that have been lost in the clipping
    shifting of at least some grays in the image (e.g. darken the 18% grays) to give a better visual rendering on a typical higher peak brightness display.

The approach uses a prediction of this HDR signal from the available LDR data, so that the required residual information is reduced.

The approach uses an improved characterization of the mapping from different LDR values to HDR values automatically taking into account things that happen to all underlying object colors (e.g. a part of a text character in the block overlapping several objects etc.).

The described example ignores the actual per-pixel fine accuracy spatial profile, but using the "local average" our "all-colors-adaptive" approach will typically result in better prediction (e.g. on either side of edges by using the input LDR value as a rough index to look up the corresponding bin which then yields the approximate HDR value needed). This results in a good object-in-HDR average starting value for any such object possibly present, thus needing lesser residue.

Specifically, a mapping grid is constructed, e.g. subsampled in space (since only the local averages are used and not the exact geometric HDR microprofile), and with an HDR value for each possible LDR value (or combination of color coordinates). In some embodiments a value subsampling may also be performed e.g. with an HDR value per step of 4 luminance codings of the LDR.

Figure 10:
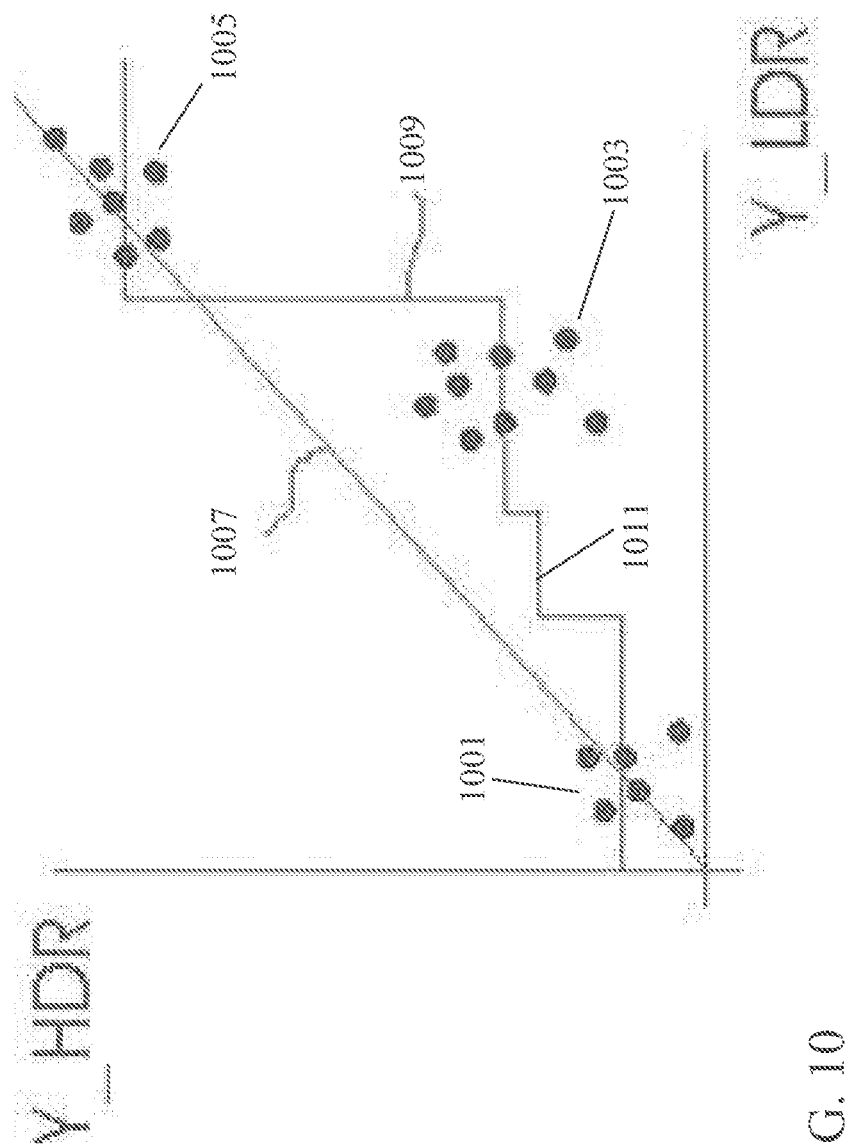
FIG. 10 illustrates an example of a mapping in accordance with some embodiments of the invention.

The described approach may provide a particularly efficient adaptation of the mapping to the specific local characteristics and may in many scenarios provide a particularly accurate prediction. This may be illustrated by the example of FIG. 10 which illustrates relationships between the luminance for the LDR image Y_LDR and the luminance for corresponding HDR image Y_HDR. FIG. 10 illustrates the relationship for a specific macro-block which happens to include elements of three different objects. As a consequence the pixel luminance relations (indicated by dots) are located in three different clusters 1001, 1003, 1005.

The algorithms of the prior art will perform a linear regression on the relationship thereby generating a linear relationship between the LDR luminance values and the HDR luminance values, such as e.g. the one indicated by the line 1007. However, such an approach will provide relatively poor mapping/prediction for at least some of the values, such as those belonging to the image object of cluster 1003.

In contrast, the approach described above will generate a much more accurate mapping such as the one indicated by line 1009. This mapping will much more accurately reflect the characteristics and suitable mapping for all of the clusters and will thus result in an improved mapping. Indeed, the mapping may not only provide accurate results for luminances corresponding to the clusters but can also accurately predict relationships for luminances inbetween, such as for the interval indicated by 1011. Such mappings can be obtained by interpolation.

Furthermore, such accurate mapping information can be determined automatically by simple processing based on reference images (and in the specific case based on two reference macro blocks). In addition, the accurate mapping can be determined independently by an encoder and a decoder based on previous images and thus no information of the mapping needs to be included in the data stream. Thus, overhead of the mapping may be minimized.

In the previous example, the approach was used as part of a decoder for an HDR image. However, it will be appreciated that the principles may be used in many other applications and scenarios. For example, the approach may be used to simply generate an HDR image from an LDR image. For example, suitable local reference images may be selected locally and used to generate a suitable mapping. The mapping may then be applied to the LDR image to generate an HDR image (e.g. using interpolation). The resulting HDR image may then be displayed on an HDR display.

Also, it will be appreciated that the decoder in some embodiments may not consider any residual data (and thus that the encoder need not generate the residual data). Indeed, in many embodiments the HDR image generated by applying the mapping to the decoded LDR image may be used directly as the output HDR image without requiring any further modification or enhancement.

The described approach may be used in many different applications and scenarios and may for example be used to dynamically generate real-time HDR video signals from LDR video signals. For example, the decoder 115 may be implemented in a set-top box or other apparatus having an input connector receiving the video signal and an output connector outputting an HDR video signal that can be displayed on a suitable high dynami range display.

As a specific example, a video signal as described may be stored on a Bluray™ disc which is read by a Bluray™ player. The Bluray™ player may be connected to the set-top box via an HDMI cable and the set-top box may then generate the HDR image. The set-top box may be connected to a display (such as a television) via another HDMI connector.

In some scenarios, the decoder or HDR image generation functionality may be included as part of a signal source, such as a Bluray™ player or other media player. As another alternative, the functionality may be implemented as part of a display, such as a computer monitor or television. Thus, the display may receive an LDR stream that can be modified to provide LDR images. Hence, a signal source, such as a media player, or a display, such as a computer monitor or television, which delivers a significantly improved user experience can be provided.

The described approach may be applied to each individual color channel for an image. For example, for an RGB image, the approach may be individually applied to each of the R, G and B channels. However, in some embodiments, the combination value used for the mapping input may be a luminance value whereas the output data may be an individual color component value. For example, the RGB value for a given pixel may be combined into a single luminance value whereas individual HDR output pixel values are stored in the grid for each individual color channel.

Indeed, in practice, the LDR images are often generated from HDR images by means of unknown tone-mapping and color grading operations. The inventors have realized that the relationship between the individual color components for the LDR and HDR images may often be better predicted from the LDR luminance information rather than from the LDR color data. Therefore, in many embodiments, it is beneficial to use the luminance of the LDR signal for the intensity coordinates even when constructing the grid for color components, such as U and V. In other words, $V_{LDR}$ in the previous equation may be set to the luminance value $Y_{LDR}$ for all color components. Thus, the same grid may be used for all color channels with each bin storing an output HDR value for each color channel.

In the specific described examples, the input data for the mapping simply consisted in two spatial dimensions and a single pixel value dimension representing an intensity value that may e.g. correspond to a luminance value for the pixel or to a color channel intensity value.

However, more generally the mapping input may comprise a combination of color coordinates for pixels of a LDR image. Each color coordinate may simply correspond to one value of a pixel, such as to one of the R, G and B values of an RGB signal or to one of the Y, U, V values of a YUV signal. In some embodiments, the combination may simply correspond to the selection of one of the color coordinate values, i.e. it may correspond to a combination wherein all color coordinates apart from the selected color coordinate value are weighted by zero weights.

In other embodiments, the combination may be of a plurality of color coordinates for a single pixel. Specifically, the color coordinates of an RGB signal may simply be combined to generate a luminance value. In other embodiments, more flexible approaches may be used such as for example a weighted luminance value where all color channels are considered but the color channel for which the grid is developed is weighted higher than the other color channels.

In some embodiments, the combination may take into account pixel values for a plurality of pixel positions. For example, a single luminance value may be generated which takes into account not only the luminance of the pixel for the position being processed but which also takes into account the luminance for other pixels.

Indeed, in some embodiments, combination values may be generated which do not only reflect characteristics of the specific pixel but also characteristics of the locality of the pixel and specifically of how such characteristics vary around the pixel.

As an example, a luminance or color intensity gradient component may be included in the combination. E.g. the combination value may be generated taking into account the difference between luminance of the current pixel value and the luminances of each of the surrounding pixels. Further the difference to the luminances to the pixels surrounding the surrounding pixels (i.e. the next concentric layer) may be determined. The differences may then be summed using a weighted summation wherein the weight depends on the distance to the current pixel. The weight may further depend on the spatial direction, e.g. by applying opposite signs to differences in opposite directions. Such a combined difference based value may be considered to be indicative of a possible luminance gradient around the specific pixel.

Thus, applying such a spatially enhanced mapping may allow the HDR image generated from a LDR image to take spatial variations into account thereby allowing it to more accurately reflect such spatial variations.

As another example, the combination value may be generated to reflect a texture characteristic for the image area included the current pixel position. Such a combination value may e.g. be generated by determining a pixel value variance over a small surrounding area. As another example, repeating patterns may be detected and considered when determining the combination value.

Indeed, in many embodiments, it may be advantageous for the combination value to reflect an indication of the variations in pixel values around the current pixel value. For example, the variance may directly be determined and used as an input value.

As another example, the combination may be a parameter such as a local entropy value. The entropy is a statistical measure of randomness that can e.g. be used to characterize the texture of the input image. An entropy value H may for example be calculated as:

$$H(I) = -\sum_{j=1}^{n} p(I_j) \log_b p(I_j),$$

where p( ) denotes the probability density function for the pixel values $I_j$ in the image I. This function can be estimated by constructing the local histogram over the neighborhood being considered (in the above equation, n neighboring pixels). The base of the logarithm b is typically set to 2.

It will be appreciated that in embodiments wherein a combination value is generated from a plurality of individual pixel values, the number of possible combination values that are used in the grid for each spatial input set may possibly be larger than the total number of pixel value quantization levels for the individual pixel. E.g. the number of bins for a specific spatial position may exceed the number of possible discrete luminance values that a pixel can attain. However, the exact quantization of the individual combination value, and thus the size of the grid, is best optimized for the specific application.

It will be appreciated that the generation of the HDR image from the LDR image can be in response to various other features, parameters and characteristics.

For example, the generation of the HDR image may be in response to depth information associated with the LDR image. Such an approach may in principle be used without the described mapping and it is conceivable that the HDR image can be generated e.g. based only on the LDR image and the depth information. However, particularly advantageous performance can be achieved when the LDR to HDR mapping is used together with a depth based prediction.

Figure 11:
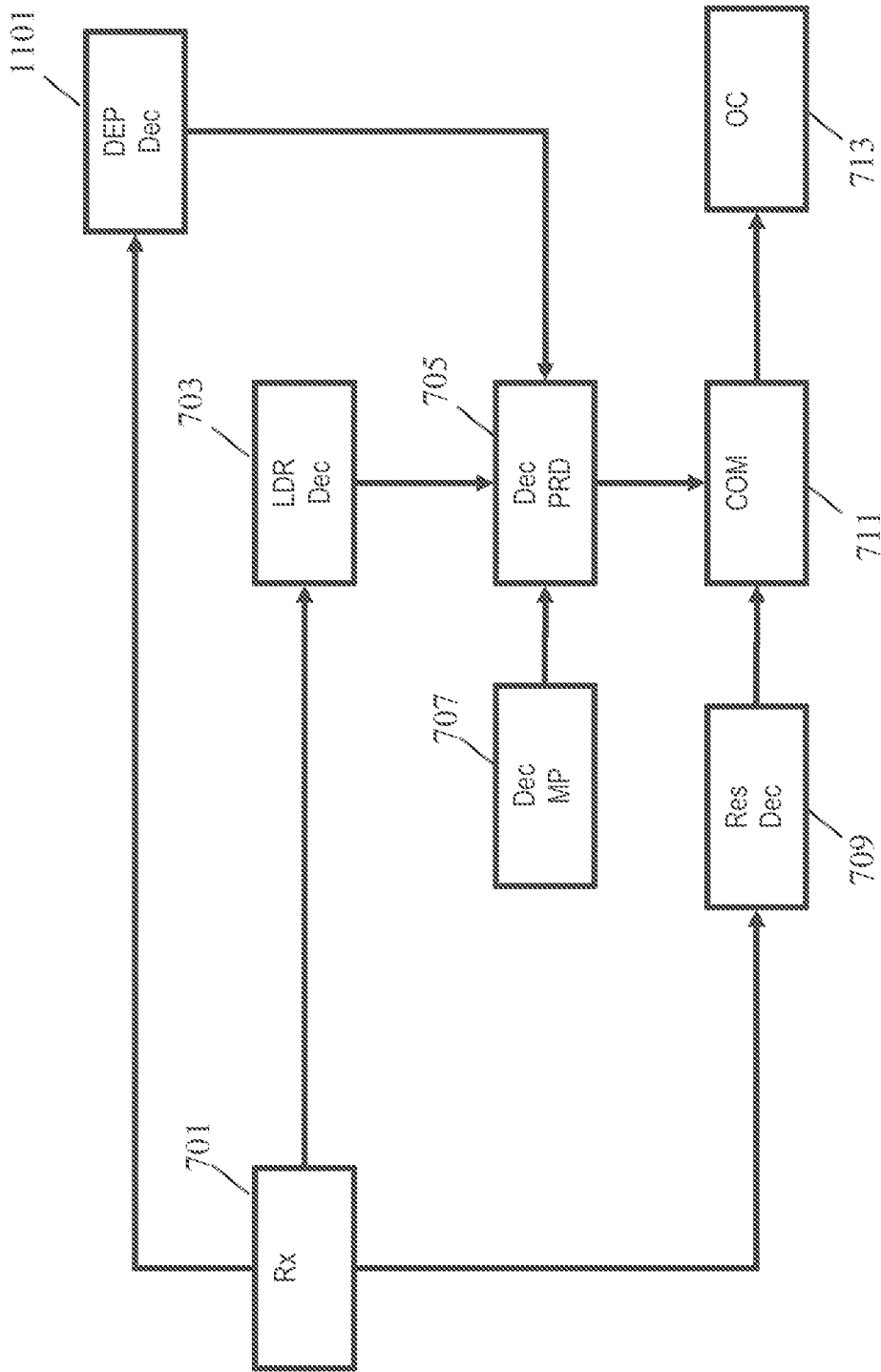
FIG. 11 is an illustration of an example of a decoder in accordance with some embodiments of the invention.

Therefore in some embodiments the encoder may also include a depth decoder which e.g. encodes a depth map for the LDR image and includes the encoded depth data in the data stream which is transmitted to the decoder. The decoder can then decode the depth map and generate the HDR image in response to the decoded depth map. FIG. 11 illustrates how the decoder of FIG. 7 may be enhanced by the inclusion of a depth decoder 1101 which is fed the encoded depth data from the receive circuit 701 and which then proceeds to decode the data to generate the depth map for the LDR image. The depth map is then fed to the decode predictor 705 where it is used to generate the prediction for the HDR image (or in some examples it may be used to generate an HDR image which is used directly as the output HDR image). Note that our embodiments for LDR-to-HDR prediction are aided by any 3D information (e.g. an encoded depth map, whether co-encoded with 1 or several views, or a depth map derived from several views), but the same functions also when an approximate depth map is estimated on a single view (e.g. with an algorithm combining depth from geometry, shading etc.). Hence the block depth decoder should in general be seen as a depth indication generating unit.

For example, in scenes that are lit by bright focused lights, the foreground objects may often be brighter than objects that are in the background. Thus, having knowledge of the depth of a given object, may be used to determine how the increased dynamic range is utilized. For example, foreground objects may be made brighter to exploit the additional dynamic range of an HDR image whereas background objects may not necessarily be brightened equivalently as this could potentially increase the perceived significance of background objects more than intended or realized by the specific lighting of the scene. The depth may also be used in a final rendering transformation, to make optimal use of the luminance range of the display and the allocation of it to different scene elements, in particular with different depths. Since there is a relationship between luminance and depth perception (and even story-related properties such as attention), this can be used to optimally allocate final V_HDR values for rendering.

The mapping to generate HDR output pixels may thus not only be dependent on the colour combinations and image position but may also be dependent on the depth information at that position. This information may be included in the mapping in different ways. For example, different mapping grids may be generated for the combinations of colour combinations and for the depth values, and thus for each position a look-up in two look up tables may be performed. The resulting two HDR prediction values for the given position may then be generated by a combination of the two HDR values, e.g. by a simple averaging. As another example, a single look-up table having input sets comprising combinations of colour coordinates and spatial positions and an output in the form of an HDR value may be used (e.g. the same look-up table in the example of FIG. 7). The depth consideration may then be achieved by a depth dependent adaptation of the input data prior to the table look-up and/or by a depth dependent adaptation of the output HDR value. The functions that are applied to the input and/or output data may be predetermined functions or may e.g. be determined based on previous images. Interestingly, different HDR values for different views may give more realism to e.g. special bidirectional reflection properties of the captured scene elements, but even the desired HDR experience as encoded may be manifold, and e.g. depend on how a depth is exaggerated during rendering of the images (e.g. one may want objects protruding far towards the viewer not to be to bright). The present strategies, by repeating may have several HDR variants for at least some views e.g., wherefrom more appropriate final rendering signals for the views may be derived taking into account user settings.

In some embodiments, the mapping may be implemented as a grid that also includes depth information. For example, each bin may be defined by an interval for each spatial image dimension, an interval for each colour coordinate, and an interval for the depth value. Such a table may be populated as previously described except that for each pixel position, the bin is further selected such that the depth indication for the pixel position falls within the depth interval of the bin. Such population may of course be based on a previous image and depth map and may accordingly be performed independently but consistently at both the encoder and the decoder.

Other parameters that may be considered in the mapping may include various image characteristics such as for example characteristics of image objects. For example, it is known that skin tones are very sensitive to manipulation in order for them to maintain a natural look. Therefore, the mapping may particularly take into account whether the combination of colour coordinates corresponds to skin tones and may perform a more accurate mapping for such tones.

As another example, the encoder and/or decoder may comprise functionality for extracting and possible identifying image objects and may adjust the mapping in response to characteristics of such objects. For example, various algorithms are known for detection of faces in an image and such algorithms may be used to adapt the mapping in areas that are considered to correspond to a human face.

Thus, in some embodiments the encoder and/or decoder may comprise means for detecting image objects and means for adapting the mapping in response to image characteristics of the image objects. In particular, the encoder and/or decoder may comprise means for performing face detection and means for adapting the mapping in response to face detection.

It will be appreciated that the mapping may be adapted in many different ways. As a low complexity example, different grids or look-up tables may simply be used for different areas. Thus, the encoder/decoder may be arranged to select between different mappings in response to the face detection and/or image characteristics for an image object.

As a specific example, the encoder and/or decoder may in the reference images identify any areas that are considered to correspond to human faces. For these areas, one look-up table may be generated and a second look-up table may be used for other areas. The generation of the two look-up tables may use different approaches and/or the mapping may be different in the two examples. For example, the mapping may be generated to include a saturation increase for general areas but not for areas that correspond to faces. As another example, finer granularity of the mapping for face areas may be used than for areas that do not correspond to faces.

Other means of adapting the mapping can be envisaged. For example, in some embodiments the input data sets may be processed prior to the mapping. For example, a parabolic function may be applied to colour values prior to the table look-up. Such a preprocessing may possibly be applied to all input values or may e.g. be applied selectively. For example, the input values may only be pre-processed for some areas or image objects, or only for some value intervals. For example, the preprocessing may be applied only to colour values that fall within a skin tone interval and/or to areas that are designated as likely to correspond to a face.

Alternatively or additionally, post-processing of the output HDR pixel values may be applied. Such post-processing may similarly be applied throughout or may be selectively applied. For example, it may only be applied to output values that correspond to skin tones or may only be applied to areas considered to correspond to faces. In some systems, the post-processing may be arranged to partially or fully compensate for a pre-processing. For example, the pre-processing may apply a transform operation with the post-processing applying the reverse transformation.

As a specific example, the pre-processing and/or post-processing may comprise a filtering of (one or more) of the input/output values. This may in many embodiments provide improved performance and in particular the mapping may often result in improved prediction. For example the filtering may result in reduced banding.

As an example of a pre-processing it may in some examples be desirable to apply a color transformation to a suitable color space. Many standard video color spaces (e.g. YCbCr) are only loosely connected to human perception. It may therefore be advantageous to convert the video data into a perceptually uniform color space (color spaces in which a certain step size corresponds to a fixed perceptual difference). Examples of such a color spaces include Yu'v', CIELab or CIELuv. The benefit of such a preprocessing step is that errors resulting from prediction inaccuracies will have a perceptually more uniform effect.

In some embodiments the mapping may be non-uniformly subsampled. The mapping may specifically be at least one of a spatially non-uniform subsampled mapping; a temporally non-uniform subsampled mapping; and a combination value non-uniform subsampled mapping.

The non-uniform subsampling may be a static non-uniform subsampling or the non-uniform subsampling may be adapted in response to e.g. a characteristics of the combinations of colour coordinates or of an image characteristic.

For example, the colour value subsampling may be dependent on the colour coordinate values. This may for example be static such that bins for colour values corresponding to skin tones may cover much smaller colour coordinate value intervals than for colour values that cover other colours.

As another example, a dynamic spatial subsampling may be applied wherein a much finer subsampling of areas that are considered to correspond to faces is used than for areas that are not considered to correspond to faces. It will be appreciated that many other non-uniform subsampling approaches can be used.

As another example, when images contain smooth gradients over a limited luminance range, it may be advantageous to use a finer quantization step for that range to prevent quantization artifacts from becoming visible in the gradient.

In yet another example, the sampling/quantisation may depend on the focus in the image. This could be derived from sharpness metrics or frequency analysis. For a blurred background the signal prediction does not need to be equally accurate as for small bright objects that a camera focuses on. In general, areas that contain few details can be quantized more coarsely, as the piecewise linear approximation offered by the described approach will suffice.

In the previous examples, a three dimensional mapping/grid has been used. However, in other embodiments an N dimensional grid may be used where N is an integer larger than three. In particular, the two spatial dimensions may be supplemented by a plurality of pixel value related dimensions.

Thus, in some embodiments the combination may comprise a plurality of dimensions with a value for each dimension. As a simple example, the grid may be generated as a grid having two spatial dimensions and one dimension for each color channel. E.g. for an RGB image, each bin may be defined by a horizontal position interval, a vertical position interval, an R value interval, a G value interval and a B value interval).

As another example, the plurality of pixel value dimensions may additionally or alternatively correspond to different spatial dimensions. For example, a dimension may be allocated to the luminance of the current pixel and to each of the surrounding pixels.

Such, multi-dimensional grids may provide additional information that allows an improved prediction and in particular allows the HDR image to more closely reflect relative differences between pixels.

In some embodiments, the encoder may be arranged to adapt the operation in response to the prediction.

For example, the encoder may generate the predicted HDR image as previously described and may then compare this to the input HDR image. This may e.g. be done by generating the residual image and evaluating this image. The encoder may then proceed to adapt the operation in dependence on this evaluation, and may in particular adapt the mapping and/or the residual image depending on the evaluation.

As a specific example, the encoder may be arranged to select which parts of the mapping to include in the encoded data stream based on the evaluation. For example, the encoder may use a previous set of images to generate the mapping for the current image. The corresponding prediction based on this mapping may be determined and the corresponding residual image may be generated. The encoder may evaluate the residual areas to identify areas in which the prediction is considered sufficiently accurate and areas in which the prediction is considered to not be sufficiently accurate. E.g. all pixel values for which the residual image value is lower than a given predetermined threshold may be considered to be predicted sufficiently accurately. Therefore, the mapping values for such areas are considered sufficiently accurate, and the grid values for these values can be used directly by the decoder. Accordingly, no mapping data is included for input sets/bins that span only pixels that are considered to be sufficiently accurately predicted.

However, for the bins that correspond to pixels which are not sufficiently accurately predicted, the encoder may proceed to generate new mapping values based on using the current set of images as the reference images. As this mapping information cannot be recreated by the decoder, it is included in the encoded data. Thus, the approach may be used to dynamically adapt the mapping to consist of data bins reflecting previous images and data bins reflecting the current images. Thus, the mapping is automatically adapted to be based on the previous images when this is acceptable and the current images when this is necessary. As only the bins generated based on the current images need to be included in the encoded output stream, an automatic adaptation of the communicated mapping information is achieved.

Thus in some embodiments, it may be desirable to transmit a better (not decoder-side constructed) LDR-HDR mapping for some regions of the image, e.g. because the encoder can detect that for those regions, the HDR image prediction is not sufficiently good, e.g. because of critical object changes, or because the object is really critical (such as a face).

In some embodiments, a similar approach may alternatively or additionally be used for the residual image. As a low complexity example, the amount of residual image data that is communicated may be adapted in response to a comparison of the input high dynamic range image and the predicted high dynamic range image. As a specific example, the encoder may proceed to evaluate how significant the information in the residual image is. For example, if the average value of the pixels of the residual image is less than a given threshold, this indicates that the predicted image is close to the input HDR image. Accordingly, the encoder may select whether to include the residual image in the encoded output stream or not based on such a consideration. E.g. if the average luminance value is below a threshold, no encoding data for the residual image is included and if it is above the threshold encoding data for the residual image is included.

In some embodiments a more nuanced selection may be applied wherein residual image data is included for areas in which the pixel values on average are above a threshold but not for image areas in which the pixel values on average are below the threshold. The image areas may for example have a fixed size or may e.g. be dynamically determined (such as by a segmentation process).

In some embodiments, the encoder may further generate the mapping to provide desired visual effects. For example, in some embodiments, the mapping may not be generated to provide the most accurate prediction but rather may be generated to alternatively or additionally impart a desired visual effect. For example, the mapping may be generated such that the prediction also provides e.g. a color adjustment, a contrast increment, sharpness correction etc. Such a desired effect may for example be applied differently in different areas of the image. For example, image objects may be identified and different approaches for generating the mapping may be used for the different areas.

Indeed, in some embodiments, the encoder may be arranged to select between different approaches for generating the mapping in response to image characteristics, and in particular in response to local image characteristics.

For example, the encoder may provide an increased dynamic range extension in areas dominated by mid-luminance pixels than for areas dominated by high or low luminance pixels. Thus, the encoder may analyze the input LDR or HDR images and dynamically select different approaches for different image areas. For example, a luminance offset may be added to specific bins dependent on characteristics of the area to which they belong. Although, this approach may still use an approach that is adapting based on the specific images it may also be used to provide desired visual image characteristics that do perhaps not result in a closer approximation to the input HDR image but rather to a desired HDR image. The approach may introduce some uncertainty of how exactly the mapping is generated in the encoder and in order to allow the decoder to independently match this mapping, the encoder may include data defining or describing the selected mapping. For example, the applied offset to individual bins may be communicated to the decoder.

In the examples, the mapping has been based on an adaptive generation of a mapping based on sets of LDR and HDR input images. In particular, the mapping may be generated based on previous LDR and HDR input images as this does not require any mapping information to be included in the encoded data stream. However, in some cases this is not suitable, e.g. for a scene change, the correlation between a previous image and the current image is unlikely to be very high. In such a case, the encoder may switch to include a mapping in the encoded output data. E.g. the encoder may detect that a scene chance occurs and may accordingly proceed to generate the mapping for the image(s) immediately following the scene change based on the current images themselves. The generated mapping data is then included in the encoded output stream. The decoder may proceed to generate mappings based on previous images except for when explicit mapping data is included in the received encoded bit stream in which case this is used.

In some embodiments, the decoder may use a reference mapping for at least some low dynamic range images of the low dynamic range video sequence. The reference mapping may be a mapping that is not dynamically determined in response to LDR and HDR image sets of the video sequence. A reference mapping may be a predetermined mapping.

For example, the encoder and decoder may both have information of a predetermined default mapping that can be used to generate an HDR image from an LDR image. Thus, in an embodiment where dynamic adaptive mappings are generated from previous images, the default predetermined mapping may be used when such a determined mapping is unlikely to be an accurate reflection of the current image. For example, after a scene change, a reference mapping may be used for the first image(s).

In such cases, the encoder may detect that a scene change has occurred (e.g. by a simple comparison of pixel value differences between consecutive images) and may then include a reference mapping indication in the encoded output stream which indicates that the reference mapping should be used for the prediction. It is likely that the reference mapping will result in a reduced accuracy of the predicted HDR image. However, as the same reference mapping is used by both the encoder and the decoder, this results only in increased values (and thus increased data rate) for the residual image.

In some embodiments, the encoder and decoder may be able to select the reference mapping from a plurality of reference mappings. Thus rather than using just one reference mapping, the system may have shared information of a plurality of predetermined mappings. In such embodiments, the encoder may generate a predicted HDR image and corresponding residual image for all possible reference mappings. It may then select the one that results in the smallest residual image (and thus in the lowest encoded data rate). The encoder may include a reference mapping indicator which explicitly defines which reference mapping has been used in the encoded output stream. Such an approach may approve the prediction and thus reduce the data rate required for communicating the residual image in many scenarios.

Thus, in some embodiments a fixed LUT (mapping) may be used (or one selected from a fixed set and with only the corresponding index being transmitted) for the first frame or the first frame after a scene change. Although, the residual for such frames will generally be higher, this is typically outweighed by the fact that no mapping data has to be encoded.

In the examples, the mapping is thus arranged as a multi-dimensional map having two spatial image dimensions and at least one combination value dimension. This provides a particularly efficient structure.

In some embodiments, a multi-dimensional filter may be applied to the multidimensional map, the multi-dimensional filter including at least one combination value dimension and at least one of the spatial image dimensions. Specifically a moderate multi-dimensional low-pass filter may in some embodiments be applied to the multi-dimensional grid. This may in many embodiments result in an improved prediction and thus reduced data rate. Specifically, it may improve the prediction quality for some signals, such as smooth intensity gradients that typically result in contouring artifacts when represented at insufficient bit depth.

In the previous description a single HDR image has been generated from an LDR image. However, multi-view capturing and rendering of scenes has been of increasing interest. For example, three dimensional (3D) television is being introduced to the consumer market. As another example, multi-view computer displays allowing a user to look around objects etc have been developed.

A multi-view image may thus comprise a plurality of images of the same scene captured or generated from different view points. The following will focus on a description for a stereo-view comprising a left and right (eye) view of a scene. However, it will be appreciated that the principles apply equally to views of a multi-view image comprising more than two images corresponding to different directions and that in particular the left and right images may be considered to be two images for two views out of the more than two images/views of the multi-view image.

In many scenarios it is accordingly desirable to be able to efficiently generate, encode or decode multi-view images and this may in many scenarios be achieved by one image of the multi-view image being dependent on another image.

Figure 12:
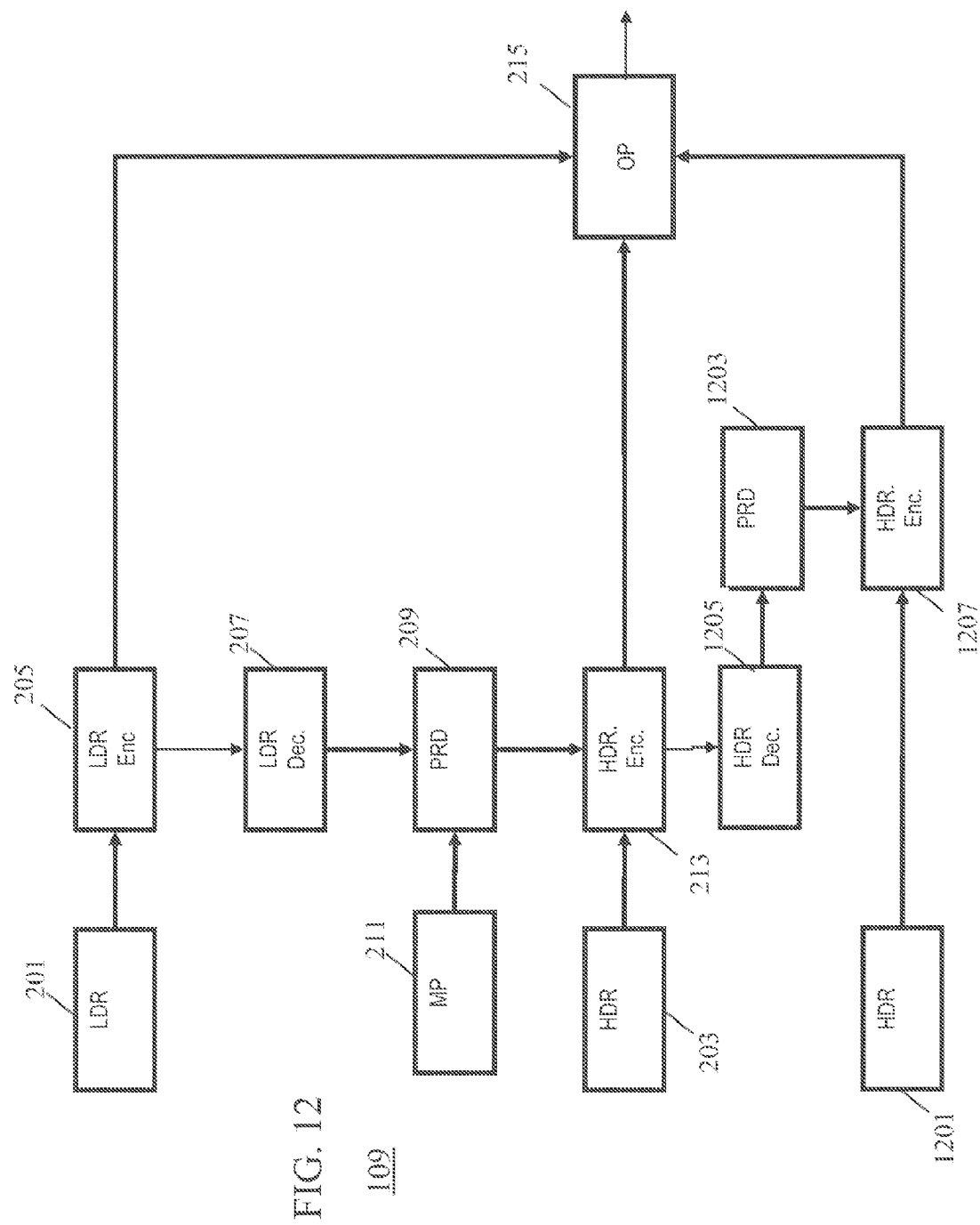
FIG. 12 is an illustration of an example of an encoder in accordance with some embodiments of the invention.

For example, based on an HDR image for a first view, an HDR image for a second view may be encoded. For example, as illustrated in FIG. 12, the encoder of FIG. 2 may be enhanced to provide encoding for a stereo view image. Specifically, the encoder of FIG. 12 corresponds to the encoder of FIG. 2 but further comprises a second receiver 1201 which is arranged to receive a second HDR image. In the following, the HDR image received by the first receiver 201 will be referred to as the first view image and the HDR image received by the second receiver 1201 will be referred to as the second view image. The first and second view images are particularly right and left images of a stereo image and thus when provided to the right and left eyes of a viewer provides a three dimensional experience.

The first view image is encoded as previously described. Furthermore, the encoded first view image is fed to a view predictor 1203 which proceeds to generate a prediction for the second view image from the first view image. Specifically, the system comprises an HDR decoder 1205 between the HDR encoder 213 and the view predictor 1203 which decodes the encoding data for the first view image and provides the decoded image to the view predictor 1203, which then generates a prediction for the second view image therefrom. In a simple example, the first view image may itself be used directly as a prediction for the second image.

The encoder of FIG. 12 further comprises a second encoder 1207 which receives the predicted image from the view predictor 1203 and the original image from the second receiver 1201. The second encoder 1207 proceeds to encode the second view image in response to the predicted image from the view predictor 1203. Specifically, the second encoder 1207 may subtract the predicted image from the second view image and encode the resulting residual image. The second encoder 1207 is coupled to the output processor 215 which includes the encoded data for the second view image in the output stream. The output processor may optionally comprise complex formatting functions, e.g. it may shuffle parts of the encoded streams, e.g. as in the interlacing scheme of FIG. 18.

The described approach may allow a particularly efficient encoding for multi-view HDR images. In particular, a very low data rate for a given image quality can be achieved.

Different approaches may be used for predicting the second image view from the first image view. As mentioned, the first image view may even in some examples be used directly as the prediction of the second view.

A particularly efficient and high performance system may be based on the same approach of mapping as described for the mapping between the LDR and HDR images.

Specifically, based on reference images, a mapping may be generated which relates input data in the form of input sets of image spatial positions and a combination of color coordinates of high dynamic range pixel values associated with the image spatial positions to output data in the form of high dynamic range pixel values. Thus, the mapping is generated to reflect a relationship between a reference high dynamic range image for the first view (i.e. corresponding to the first view image) and a corresponding reference high dynamic range image for the second view (i.e. corresponding to the second view image).

This mapping may be generated using the same principles as previously described for the LDR to HDR mapping. In particular, the mapping may be generated based on a previous stereo image. For example, for the previous stereo image, each spatial position may be evaluated with the appropriate bin of a mapping being identified as the one covering a matching image spatial interval and HDR colour coordinate intervals. The corresponding HDR colour coordinate values in the reference image for the second view may then be used to generate the output value for that bin (and may in some examples be used directly as the output value). Thus, the approach may provide advantages in line with those of the approach being applied to LDR to HDR mapping including automatic generation of mapping, accurate prediction, practical implementations etc.

A particular efficient implementation of encoders may be achieved by using common, identical or shared elements. In some systems, a predictive encoder module may be used for a plurality of encoding operations.

Specifically, a basic encoding module may be arranged to encode an input image based on a prediction of the image. The basic encoding module may specifically have the following inputs and outputs:

an encoding input for receiving an image to be encoded;
a prediction input for receiving a prediction for the image to be encoded; and
an encoder output for outputting the encoded data for the image to be encoded.

Figure 13:
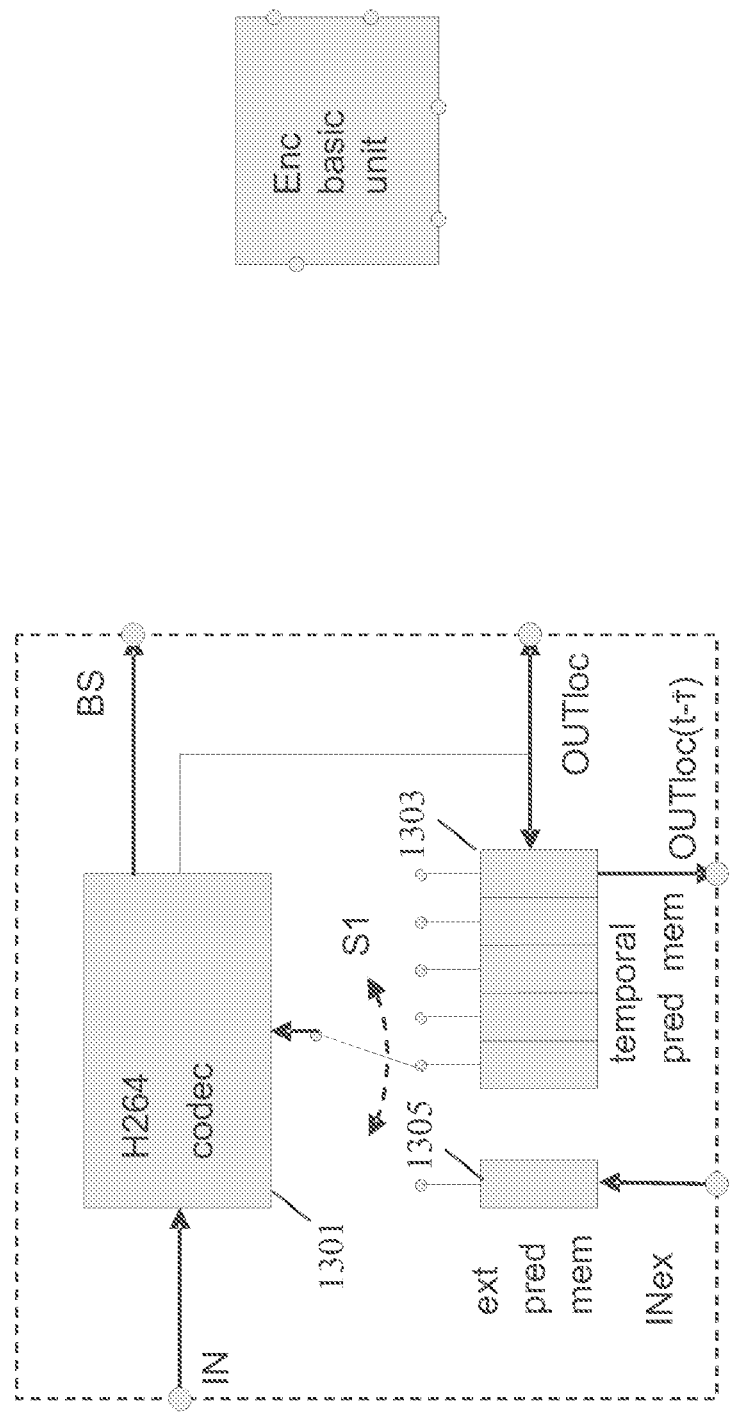
FIG. 13 is an illustration of an example of a basic encoding module that may be used in encoders in accordance with some embodiments of the invention.

An example of such an encoding module is the encoding module illustrated in FIG. 13. The specific encoding module uses an H264 codec 1301 which receives the input signal IN containing the data for the image to be encoded. Further, the H264 codec 1301 generates the encoded output data BS by encoding the input image in accordance with the H264 encoding standards and principles. This encoding is based on one or more prediction images which are stored in prediction memories 1303, 1305. One of these prediction memories 1305 is arranged to store the input image from the prediction input (INex). In particular, the basic encoding module may overwrite prediction images generated by the basic encoding module itself. Thus, in the example, the prediction memories 1303, 1305 are in accordance with the H264 standard filled with previous prediction data generated by decoding of previous encoded images of the video sequence. However, in addition, at least one of the prediction memories 1305 is overwritten by the input image from the prediction input, i.e. by a prediction generated externally. Whereas the prediction data generated internally in the encoding module is typically temporal or spatial predictions i.e. from previous or future images of the video sequence or from spatially neighbouring areas, the prediction provided on the prediction input may typically be non-temporal, non-spatial predictions. For example, it may be a prediction based on an image from a different view. For example, the second view image may be encoded using an encoding module as described, with the first view image being fed to the prediction input.

The exemplary encoding module of FIG. 13 further comprises an optional decoded image output $OUT_{loc}$ which can provide the decoded image resulting from decoding of the encoded data to external functionality. Furthermore, a second optional output in the form of a delayed decoded image output $OUT_{loc(\tau-1)}$ provides a delayed version of the decoded image. The encoding unit may specifically be an encoding unit as described in WO2008084417, the contents of which is hereby incorporated by reference.

Thus, in some examples the system may encode a video signal wherein image compression is performed and multiple temporal predictions are used with multiple prediction frames being stored in a memory, and wherein a prediction frame in memory is overwritten with a separately produced prediction frame.

The overwritten prediction frame may specifically be one or more of the prediction frames longest in memory.

The memory may be a memory in an enhancement stream encoder and a prediction frame may be overwritten with a frame from a base stream encoder.

In particular, a temporal prediction frame may be overwritten with a depth view frame.

The encoding module may be used in many advantageous configurations and topologies, and allows for a very efficient yet low cost implementation. For example, in the encoder of FIG. 12, the same encoding module may be used both for the LDR encoder 205, the HDR encoder 213 and the second HDR encoder 1207.

Various advantageous configurations and uses of an encoding module such as that of FIG. 13 will be described with reference to FIGS. 14-17.

Figure 14:
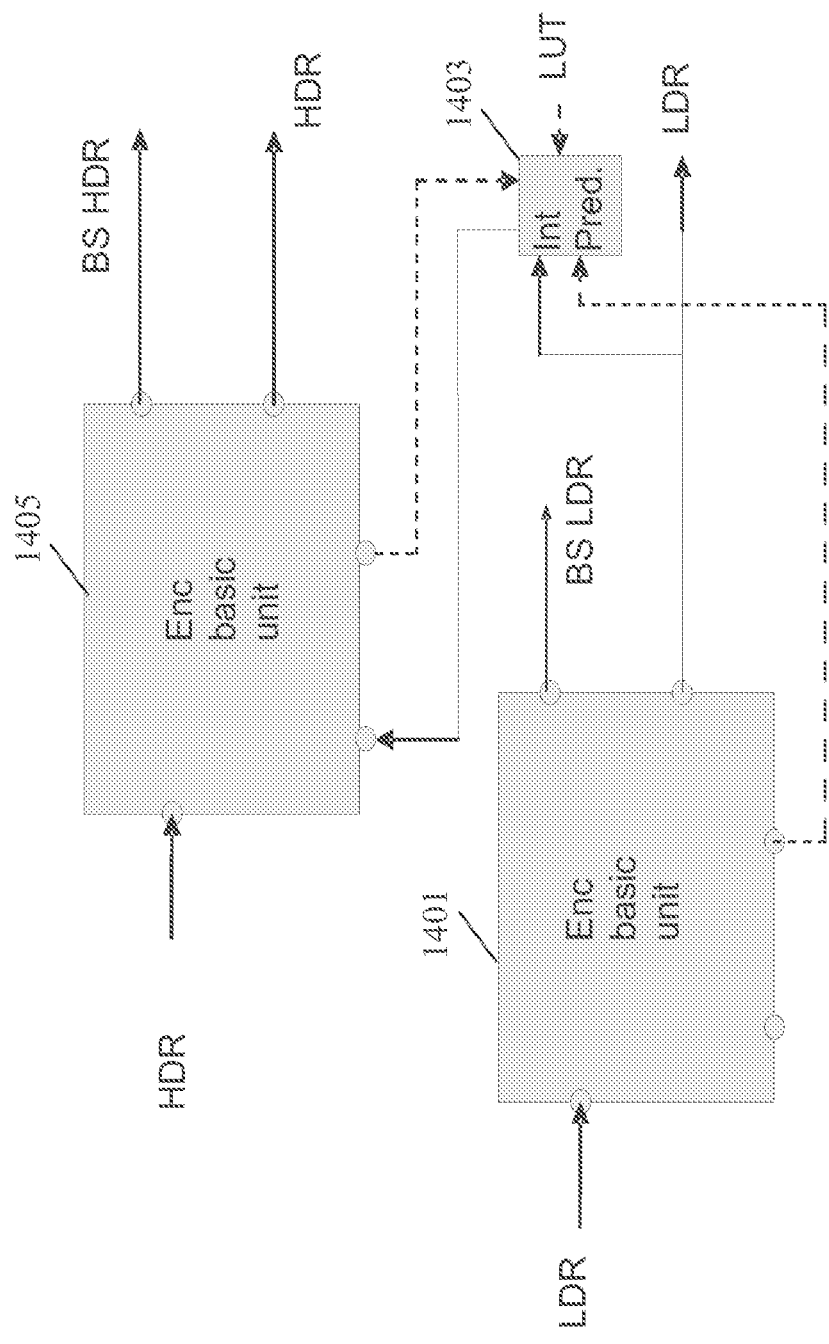
FIG. 14-17 illustrates examples of encoders using the basic encoding module of FIG. 13.

FIG. 14 illustrates an example wherein a basic encoding module, such as that of FIG. 13, may be used for encoding of both an LDR image and a corresponding HDR image in accordance with the previously described principles. In the example, the basic encoding module 1401, 1405 is used both to encode the LDR image and the HDR image. In the example, the LDR image is fed to the encoding module 1401 which proceeds to generate an encoded bitstream BS LDR without any prediction for the LDR image being provided on the prediction input (although the encoding may use internally generated predictions, such as temporal predictions used for motion compensation).

The basic encoding module 1401 further generates a decoded version of the LDR image on the decoded image output and a delayed decoded image on the delayed decoded image output. These two decoded images are fed to the predictor 1403 which further receives a delayed decoded HDR image, i.e. a previous HDR image. The predictor 1403 proceeds to generate a mapping based on the previous (delayed) decoded LDR and HDR images. It then proceeds to generate a predicted image for the current HDR image by applying this mapping to the current decoded LDR image.

The basic encoding module 1405 then proceeds to encode the HDR image based on the predicted image. Specifically, the predicted image is fed to the prediction input of the basic encoding module 1405 and the HDR image is fed to the input. The basic encoding module 1405 then generates an output bitstream BS HDR corresponding to the HDR image. The two bitstreams BS LDR and BS HDR may be combined into a single output bitstream.

In the example, the same encoding module (represented by the two functional manifestations 1401, 1405) is thus used to encode both the LDR and the HDR image. This may be achieved using only one basic encoding module time sequentially. Alternatively, identical basic encoding modules can be implemented. This may result in substantial cost saving.

In the example, the HDR image is thus encoded in dependence on the LDR image whereas the LDR image is not encoded in dependence on the HDR image. Thus, a hierarchical arrangement of encoding is provided where a joint encoding/compression is achieved with one image being dependent on another (which however is not dependent on the first image).

It will be appreciated that the example of FIG. 14 may be seen as a specific implementation of the encoder of FIG. 2 where identical or the same encoding module is used for the HDR and LDR image. Specifically, the same basic encoding module may be used to implement both the LDR encoder 205 and LDR decoder 207 as well as the HDR encoder 213 of FIG. 2.

Figure 15:
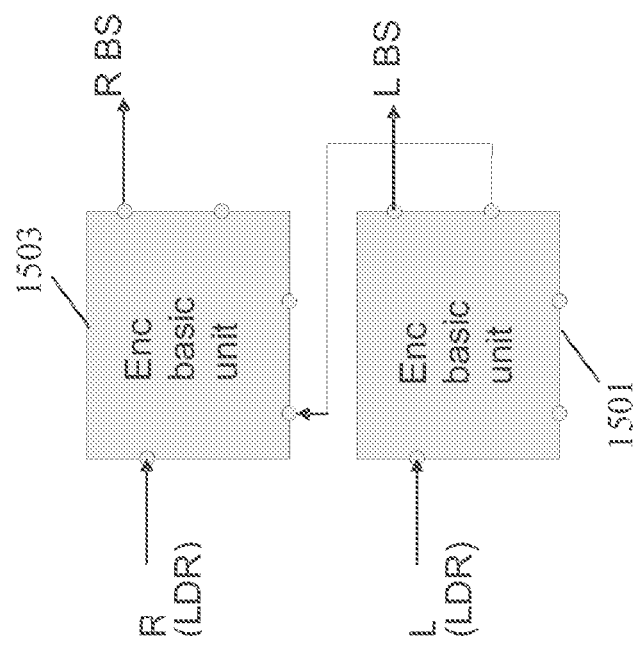

Another example is illustrated in FIG. 15. In this example, a plurality of identical or a single basic encoding module 1501, 1503 is used to perform an efficient encoding of a stereo image. In the example, a left LDR image is fed to a basic encoding module 1401 which proceeds to encode the left LDR image without relying on any prediction. The resulting encoding data is output as first bitstream L BS. Image data for a right LDR image is input on the image data input of a basic encoding module 1503. Furthermore, the left image is used as a prediction image and thus the decoded image output of the basic encoding module 1501 is coupled to the prediction input of the basic encoding module 1503 such that the decoded version of the L LDR image is fed to the prediction input of the basic encoding module 1503 which proceeds to encode the right LDR image based on this prediction. The basic encoding module 1503 thus generates a second bitstream R BS comprising encoding data for the right image (relative to the left image).

Figure 16:
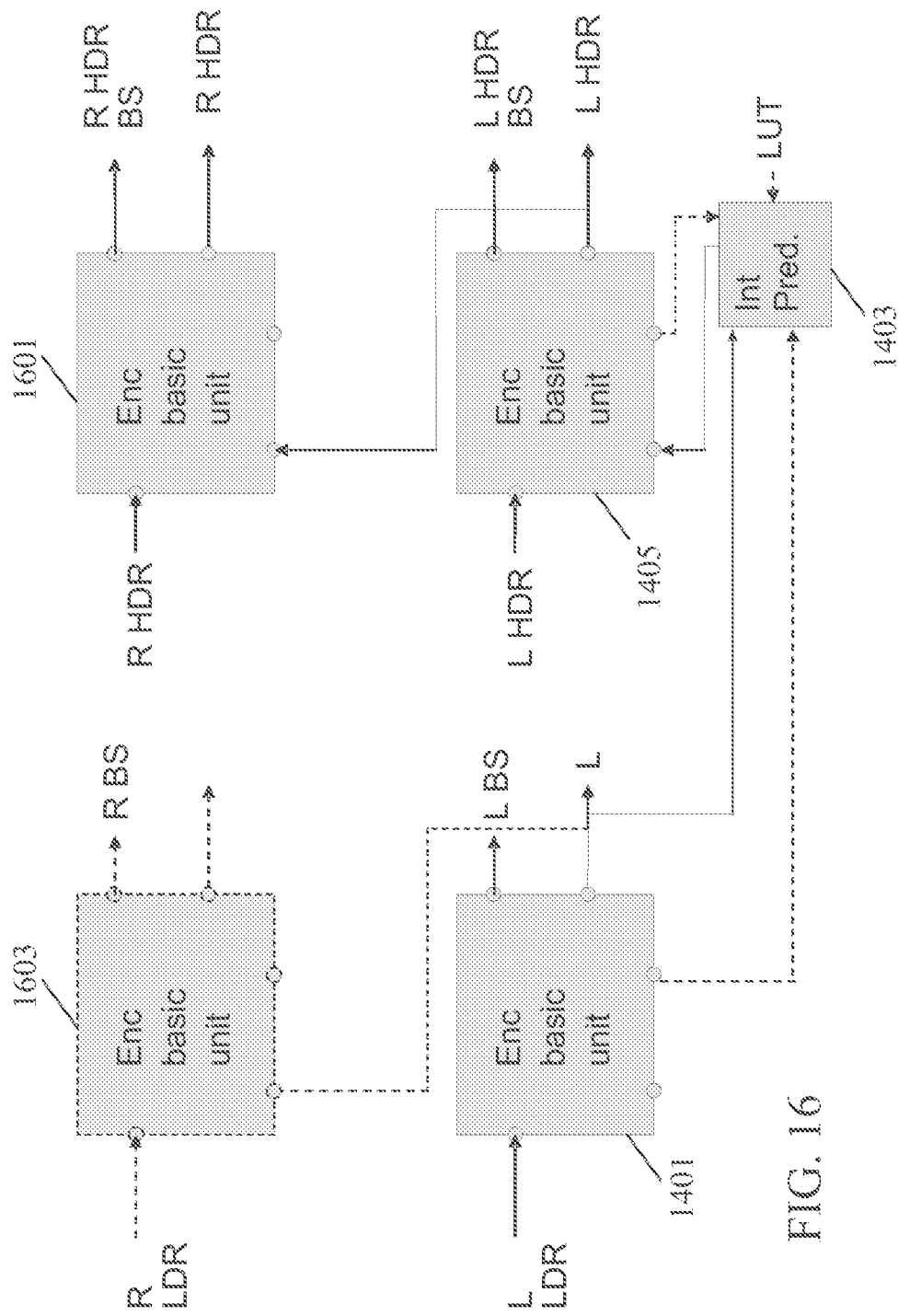

FIG. 16 illustrates an example wherein a plurality of identical or a single basic encoding module 1401, 1403, 1603, 1601 is used to provide a joint and combined encoding of both HDR and stereo views. In the example, the approach of FIG. 14 is applied to left LDR and HDR images. In addition, a right HDR image is encoded based on the left HDR image. Specifically, a right HDR image is fed to the image data input of a basic encoding module 1601 of which the prediction input is coupled to the decoded image output of the basic encoding module 1405 encoding the left HDR image. Thus, in the example, the right HDR image is encoded by the basic encoding module 1601 based on the left HDR image. Thus, the encoder of FIG. 16 generates a left LDR image bitstream L BS, a left HDR image bitstream L HDR BS, and a right HDR image bitstream R HDR BS.

In the specific example of FIG. 16, a fourth bitstream may also be encoded for a right LDR image. In the example, a basic encoding module 1603 receives a right LDR image on the image data input whereas the decoded version of the left LDR image is fed to the prediction input. The basic encoding module 1603 then proceeds to encode the right LDR image to generate the fourth bitstream R BS.

Thus, in the example of FIG. 16, both stereo and HDR characteristics are jointly and efficiently encoded/compressed. In the example, the left view LDR image is independently coded and the right view LDR image depends on the left LDR image. Furthermore, the L HDR image depends on the left LDR image. The right HDR image depends on the left HDR image and thus also on the left LDR image. In the example the right LDR image is not used for encoding/decoding any of the stereo HDR images. An advantage of this is that only 3 basic modules are required for encoding/decoding the stereo HDR signal. As such, this solution provides improved backwards compatibility.

Figure 17:
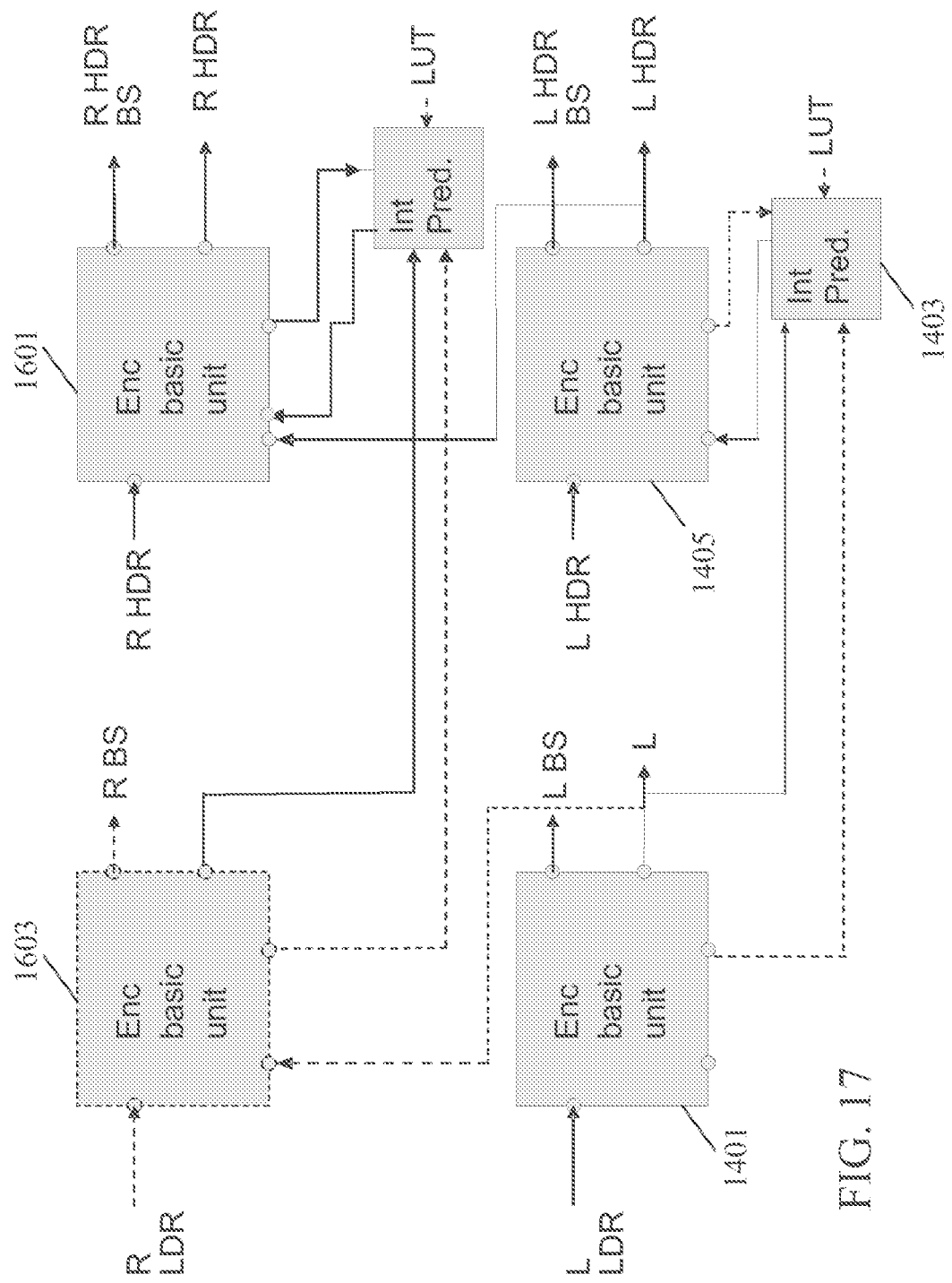

FIG. 17 illustrates an example, wherein the encoder of FIG. 16 is enhanced such that the right LDR image is also used to encode the right HDR image. Specifically, a prediction of the right HDR image may be generated from the left LDR image using the same approach as for the left HDR image. Specifically, a mapping as previously described may be used. In the example, the prediction input of the basic encoding module 1501 is arranged to receive two prediction images which may both be used for the encoding of the right HDR image. For example, the two prediction images may overwrite two prediction memories of the basic encoding module 1601.

Thus, in this example, both stereo and HDR are jointly encoded and (more) efficiently compressed. Here, the left view LDR image is independently coded and the right view LDR image is encoded dependent on the left LDR image. In this example, the right LDR image is also used for encoding/decoding the stereo HDR signal, and specifically the right HDR image. Thus, in the example, two predictions may be used for the right HDR image thereby allowing higher compression efficiency, albeit at the expense of requiring four basic encoding modules (or reusing the same basic encoding module four times).

Thus, in the examples of FIGS. 14-17, the same basic encoding/compression module is used for joint HDR and stereo coding, which is both beneficial for compression efficiency and for implementation practicality and cost.

It will be appreciated that FIGS. 14-17 are functional illustrations and may reflect a time sequential use of the same encoding module or may e.g. illustrate parallel applications of identical encoding modules.

The described encoding examples thus generate output data which includes an encoding of one or more images based on one or more images. Thus, in the examples, at least two images are jointly encoded such that one is dependent on the other but with the other not being dependent on the first. For example, in the encoder of FIG. 16, the two HDR images are jointly encoded with the right HDR image being encoded in dependence on the left HDR image (via the prediction) whereas the left HDR image is independently encoded of the right HDR image.

This asymmetric joint encoding can be used to generate advantageous output streams. Specifically, the two output streams R HDR BS and L HDR BS for the right and left HDR images respectively are generated (split) as two different data streams which can be multiplexed together to form the output data stream. The L HDR BS data stream which does not require data from the R HDR BS data stream may be considered a primary data stream and the R HDR BS data stream which does require data from the L HDR BS data stream may be considered a secondary data stream. In a particularly advantageous example the multiplexing is done such that the primary and secondary data streams are provided with separate codes. Thus, a different code (header/label) is assigned to the two data streams thereby allowing the individual data streams being separated and identified in the output data stream.

As a specific example, the output data stream may be divided into data packets or segments with each packet/segment comprising data from only the primary or the secondary data stream and with each packet/segment being provided with a code (e.g. in a header, premable, midamble or postamble) that identifies which stream is included in the specific packet/segment.

Such an approach may allow improved performance and may in particular allow backwards compatibility. For example, a fully compatible stereo decoder may be able to extract both the right and left HDR images to generate a full stereo HDR image. However, a non-stereo decoder can extract only the primary data stream. Indeed, as this data stream is independent of the right HDR image, the non-stereo decoder can proceed to decode a single HDR image using non-stereo techniques.

It will be appreciated that the approach may be used for different encoders. For example, for the encoder of FIG. 14, the BS LDR bit stream may be considered the primary data stream and the BS HDR bit stream may be considered the secondary data stream. In the example of FIG. 15, the L BS bit stream may be considered the primary data stream and the R BS bit stream may be considered the secondary data stream. Thus, in some examples, the primary data stream may comprise data which is fully self contained, i.e. which does not require any other encoding data input (i.e. which is not dependent on encoding data from any other data stream but is encoded self consistently).

Also, the approach may be extended to more than two bit streams. For example, for the encoder of FIG. 15, the L BS bitstream (which is fully self contained) may be considered the primary data stream, the L HDR BS (which is dependent on the L BS bitstream but not on the R HDR BS bitstream) may be considered the secondary data stream, and the R HDR BS bitstream (which is dependent on both the L BS and the L HDR BS bitstream) may be considered a tertiary data stream. The three data streams may be multiplexed together with each data stream being allocated its own code.

As another example, the four bit streams generated in the encoder of FIG. 16 or 17 may be included in four different parts of the output data stream. As a specific example, the multiplexing of the bit streams may generate an output stream including the following parts: part1 containing all L BS packets with descriptor code 0x1B (regular H264), part2 containing all R BS packets with descriptor code 0x20 (the dependent stereo view of MVC), part3 containing all L HDR BS packets with descriptor code 0x21 and part4 containing all R HDR BS enh packets with descriptor code 0x22. This type of multiplexing allows for flexible usage of the stereo HDR multiplex while maintaining the backward compatibility with MVC stereo and H264 mono. In particular, the specific codes allows a traditional H264 decoder decoding an LDR image while allowing suitably equipped (e.g. H264 or MVC based) decoders to decode more advanced images, such as the HDR and/or stereo images.

The generation of the output stream may specifically follow the approach described in WO2009040701 which is hereby incorporated by reference.

Such approaches may combine the advantages of other methods while avoiding their respective drawbacks. The approach comprises jointly compressing two or more video data signals, followed by forming two or more (primary and secondary) separate bit-streams. A primary bit stream that is self-contained (or not dependent on the secondary bit stream) and can be decoded by video decoders that may not be capable of decoding both bit streams. One or more secondary bit streams (often called auxiliary-video-representation streams) that are dependent on the primary bit stream. The separate bit streams are multiplexed wherein the primary and secondary bit-streams are separate bit streams provided with separate codes and transmitted. Prima facie it may seem superfluous and a waste of effort to first jointly compress signals only to split them again after compression and having them provided with separate codes. In common techniques the compressed video data signal is given a single code in the multiplexer. Prima facie the approach seems to add an unnecessary complexity in the encoding of the video data signal.

However it has been realized that splitting and separately packaging (i.e. giving the primary and secondary bit stream separate codes in the multiplexer) of the primary and secondary bit stream in the multiplexed signal has the result that, on the one hand, a standard demultiplexer in a conventional video system will recognize the primary bit stream by its code and send it to the decoder so that the standard video decoder receives only the primary stream, the secondary stream not having passed the de-multiplexer, and the standard video decoder is thus able to correctly process it as a standard video data signal, while on the other hand a specialized system can completely reverse the encoding process and re-create the original enhanced bit-stream before sending it to a suitable decoder.

In the approach the primary and secondary bit streams are separate bit streams wherein the primary bit stream may specifically be a self-contained bit stream. This allows the primary bit stream to be given a code corresponding to a standard video data signal while giving the secondary bit stream or secondary bit streams codes that will not be recognized by standard demultiplexers as a standard video data signal. At the receiving end, standard demultiplexing devices will recognize the primary bit stream as a standard video data signal and pass it on to the video decoder. The standard demultiplexing devices will reject the secondary bit-streams, not recognizing them as standard video data signals. The video decoder itself will only receive the "standard video data signal". The amount of bits received by the video decoder itself is thus restricted to the primary bit stream which may be self contained and in the form of a standard video data signal and is interpretable by standard video devices and having a bitrate which standard video devices can cope with The video decoder is not overloaded with bits it can handle.

The coding can be characterized in that a video data signal is encoded with the encoded signal comprising a first and at least a second set of frames, wherein the frames of the first and second set are interleaved to form an interleaved video sequence, or in that an interleaved video data signal comprising a first and second set of frames is received, wherein the interleaved video sequence is compressed into a compressed video data signal, wherein the frames of the first set are encoded and compressed without using frames of the second set, and the frames of the second set are encoded and compressed using frames of the first set, and whereafter the compressed video data signal is split into a primary and at least a secondary bit-stream each bit-stream comprising frames, wherein the primary bit-stream comprises compressed frames for the first set, and the secondary bit-stream for the second set, the primary and secondary bit-streams forming separate bit streams, whereafter the primary and secondary bit streams are multiplexed into a multiplexed signal, the primary and secondary bit stream being provided with separate codes.

After the interleaving at least one set, namely the set of frames of the primary bit-stream, may be compressed as a "self-contained" signal. This means that the frames belonging to this self-contained set of frames do not need any info (e.g. via motion compensation, or any other prediction scheme) from the other secondary bit streams.

The primary and secondary bit streams form separate bit streams and are multiplexed with separate codes for reasons explained above.

In some examples, the primary bit stream comprises data for frames of one view of a multi-view video data signal and the secondary bit stream comprises data for frames of another view of a multi-view data signal.

Figure 18:
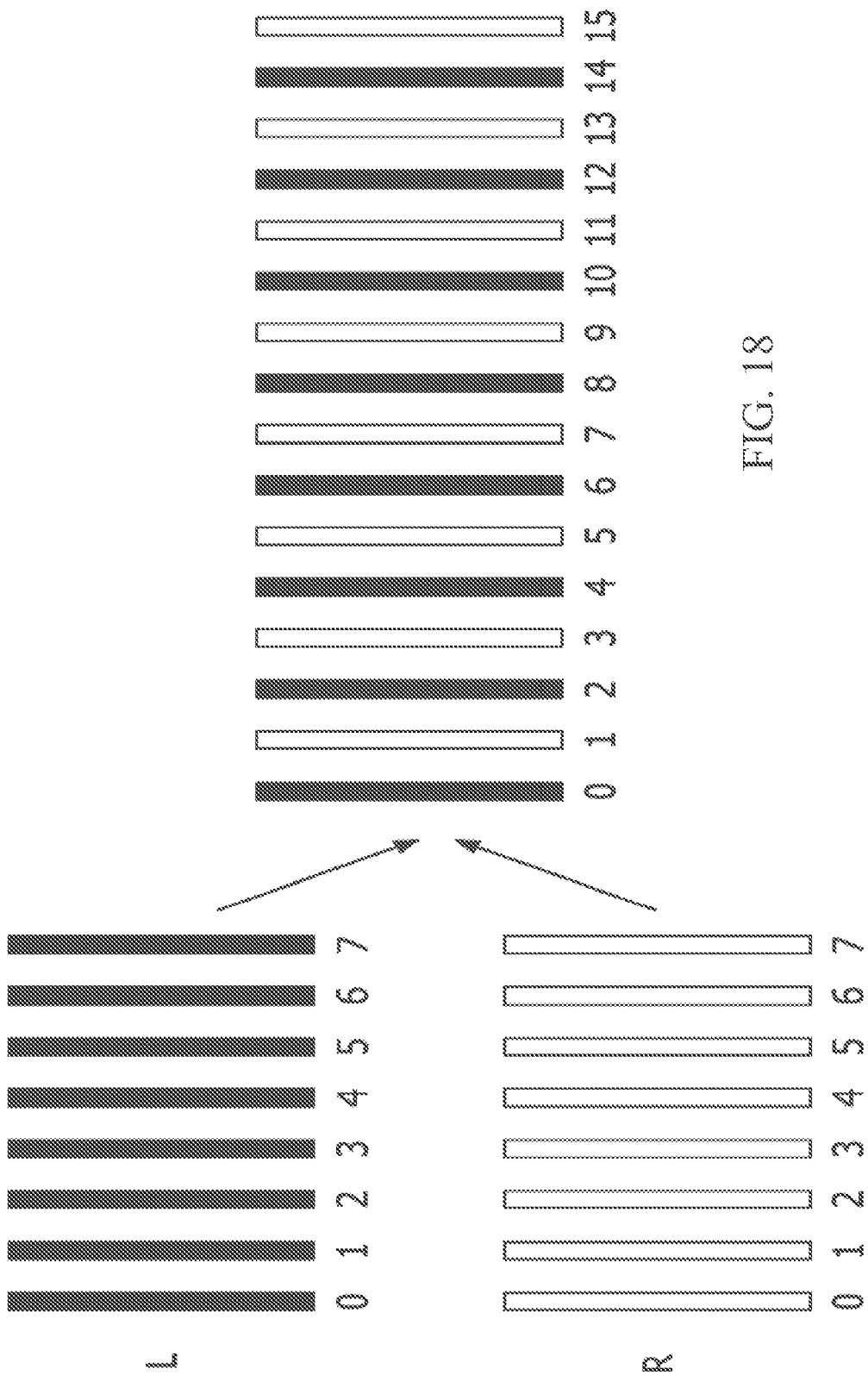
FIG. 18 illustrates an example of a multiplexing of data streams.

FIG. 18 illustrates an example of possible interleaving of two views, such as the HDR left (L) and right (R) views of the encoder of FIG. 16, each comprised of frames 0 to 7 into an interleaved combined signal having frames 0 to 15.

In the specific example, the frames/images of the L HDR BS and the R HDR BS of FIG. 16 are divided into individual frames/segments as shown in FIG. 17.

The frames of the left and right view are then interleaved to provide a combined signal. The combined signal resembles a two dimensional signal. A special feature of the compression is that the frames of one of the views is not dependent on the other (and may be a self-contained system), i.e. in compression no information from the other view is used for the compression. The frames of the other view are compressed using information from frames of the first view. The approach departs from the natural tendency to treat two views on an equal footing. In fact, the two views are not treated equally during compression. One of the views becomes the primary view, for which during compression no information is used form the other view, the other view is secondary. The frames of the primary view and the frames of the secondary view are split into a primary bit-stream and a secondary bit stream. The coding system can comprise a multiplexer which assigns a code, e.g. 0x01 for MPEG or 0x1B for H.264, recognizable for standard video as a video bit stream, to the primary bit stream and a different code, e.g. 0x20, to the secondary stream. The multiplexed signal is then transmitted. The signal can be received by a decoding system where a demultiplexer recognizes the two bit streams 0x01 or 0x1B (for the primary stream) and 0x20 (for the secondary stream) and sends them both to a bit stream merger which merges the primary and secondary stream again and the combined video sequence is then decoded by reversing the encoding method in a decoder.

Figure 19:
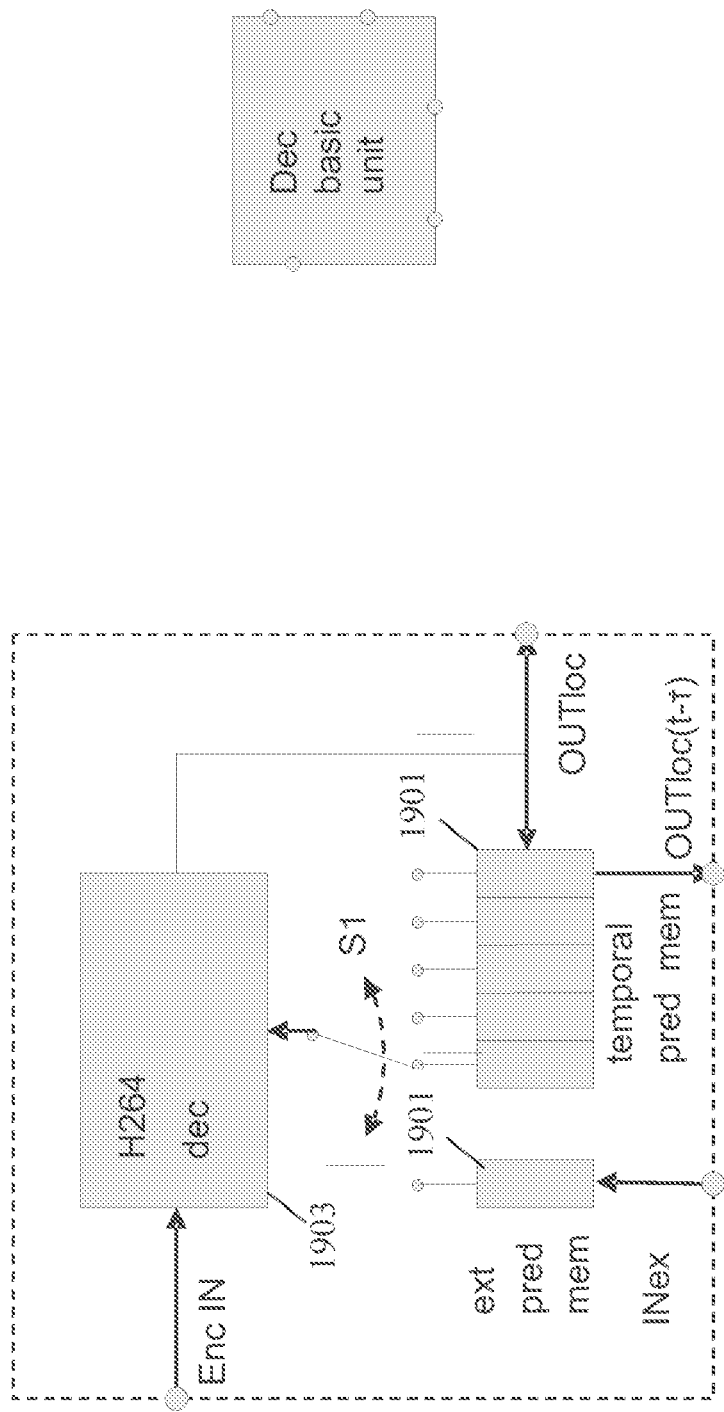
FIG. 19 is an illustration of an example of a basic decoding module that may be used in decoders in accordance with some embodiments of the invention.

It will be appreciated that the encoder examples of FIGS. 14-17 can directly be transferred to the corresponding operations at the decoder end. Specifically, FIG. 19 illustrates a basic decoding module which is a decoding module complementary to the basic encoding module of FIG. 13. The basic decoding module has an encoder data input for receiving encoder data for an encoded image which is to be decoded. Similarly to the basic encoding module, the basic decoding module comprises a plurality of prediction memories 1901 as well as a prediction input for receiving a prediction for the encoded image that is to be decoded. The basic decoding module comprises a decoder unit 1903 which decodes the encoding data based on the prediction(s) to generate a decoded image which is output on the decoder output $OUT_{loc}$. The decoded image is further fed to the prediction memories. As for the basic encoding module, the prediction data on the prediction input may overwrite data in prediction memories 1901. Also, similarly to the basic encoding module, the basic decoding module has an (optional) output for providing a delayed decoded image.

Figure 20:
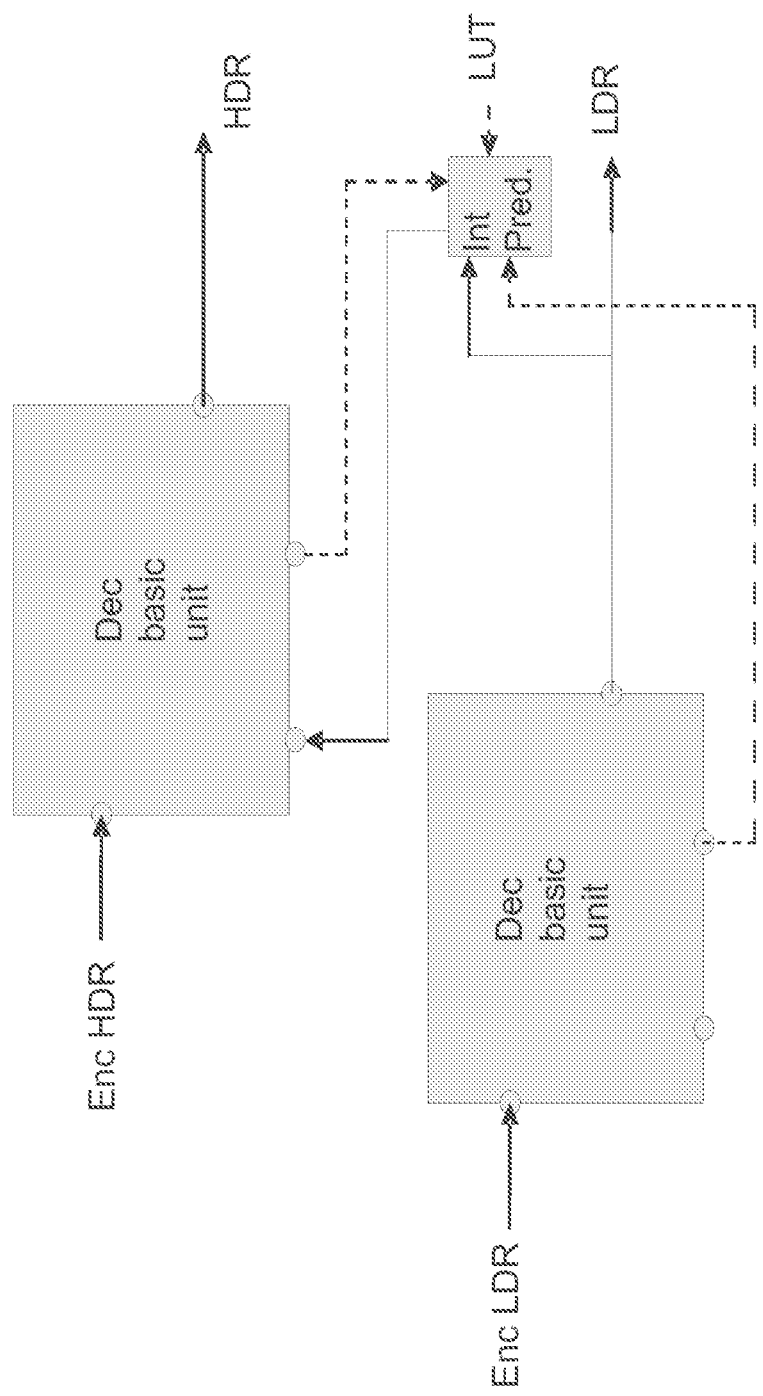
FIG. 20-22 illustrates examples of decoders using the basic decoding module of FIG. 18.

It will be clear that such a basic decoding module can be used complementary to the basic encoding module in the examples of FIG. 14-17. For example, FIG. 20 illustrates a decoder complementary to the encoder of FIG. 14. A mulitplexer (not shown) separates the LDR encoding data Enc LDR and the HDR encoding data Enc HDR. A first basic decoding module decodes the LDR image and uses this to generate a prediction for the HDR image as explained from FIG. 14. A second basic decoding module (identical to the first basic decoding module or indeed the first basic decoding module used in time sequential fashion) then decodes the HDR image from the HDR encoding data and the prediction.

Figure 21:
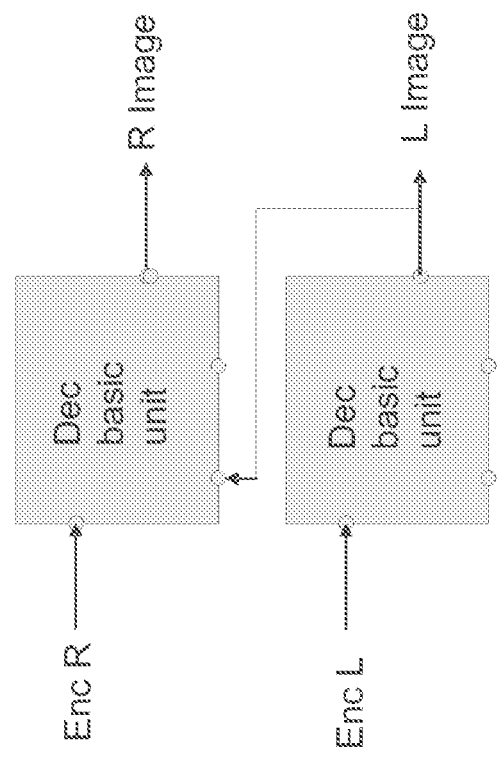

As another example. FIG. 21 illustrates an example of a complementary decoder to the encoder of FIG. 15. In the example, encoding data for the left image is fed to a first basic decoding module which decodes the left image. This is further fed to the prediction input of a second basic decoding module which also receives encoding data for the right image and which proceeds to decode this data based on the prediction thereby generating the right image.

Figure 22:
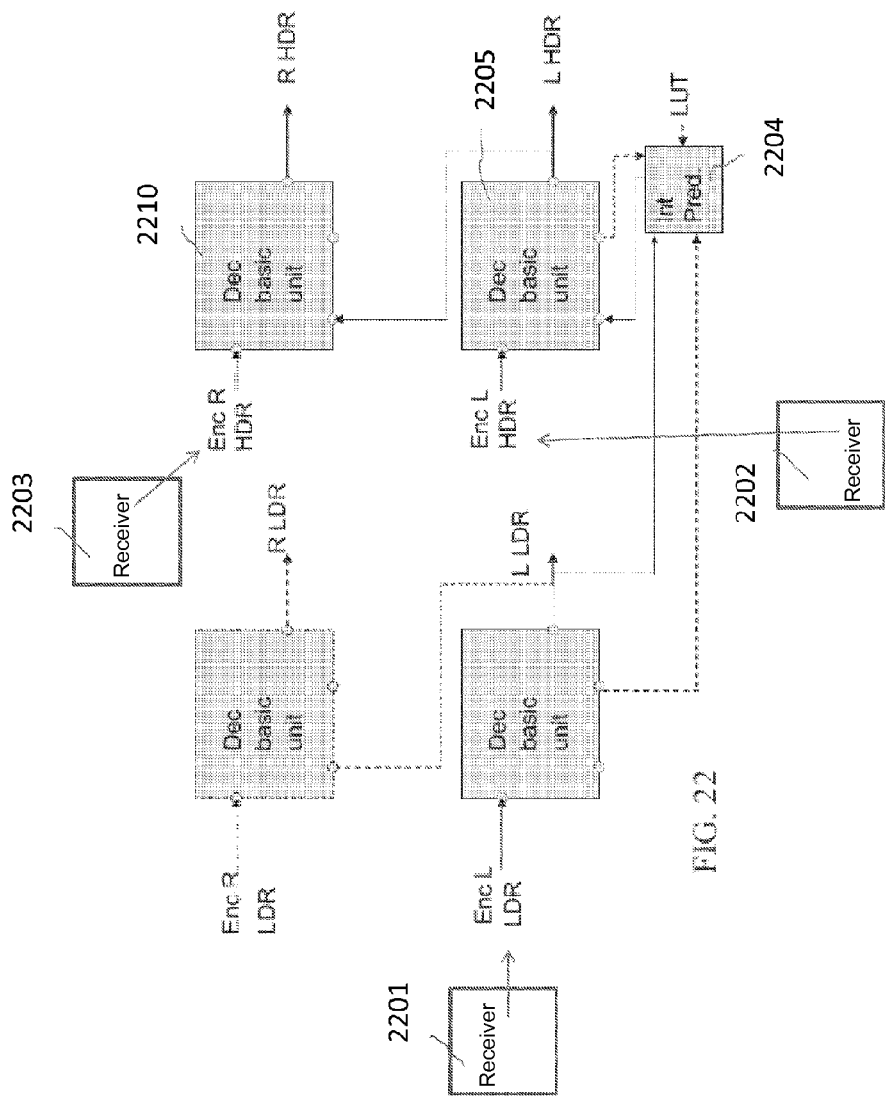

As yet another example, FIG. 22 illustrates an example of a complementary decoder to the encoder of FIG. 16.

It will be appreciated that FIGS. 20-22 are functional illustrations and may reflect a time sequential use of the same decoding module or may e.g. illustrate parallel applications of identical decoding modules.

FIG. 22 exemplary shows how one can combine several standard blocks as explained before in various combinations e.g. via resultant image memories, and further it shows several receivers 2201, 2202, 2203, which the skilled person understands can receive the various image data encoding several HDR informations or view informations, which may be reformatted and/or processed in conformity with the several possible topology embodiments and realizations, e.g via LUT 2204 as exemplified above. FIG. 22 only shows a simple example of a possible decoder realization. The skilled person will understand that other topologies are possible, e.g. the receivers 2201, 2202, 2203 may form part of a total data receiver, which may e.g. comprise other units such as a separator to format the incoming data, e.g. isolation of the different 3D/HDR encoding substreams according to the interleaved principle of FIG. 18. Furthermore, in conformity with the coding principles of the encoder, picture or other memories such as LUT 2204, or inputs to units, may be connected to processors running mathematical models, e.g. a depth calculation unit which may yield a depth map image. The picture memories as shown in FIG. 19 may contain all kinds of data represented as an image, which may be used for generating e.g. the local HDR pixel values, e.g. a computer graphics algorithm may generate a picture object of a fireball to be used in the prediction. This may be an alternative to the above described localized low resolution relationship between the LDR and HDR pixel values e.g. object profiles as rendered under different precisions or ranges.

Although the principles have been described with an encoding (decoding) employing a spatially local mapping between the LDR and HDR (color graded) images, other prediction strategies can be used for the LDR-HDR prediction (conversion). E.g., transformation strategies can be used on local regions of a picture, which may be mapping functions, or even parametric coarse level (tentative) rendering intent transformations, like e.g. the regime coding of prior European application EP10155277.6.

Also coarse semi-global adjustment profiles over a substantial regional extent of a set of images for certain time instants can be used to relate a HDR picture with a LDR picture—possibly with further refinement data—as e.g. virtual backlight encoding as described in EP10177155.8. The skilled person will understand how to substitute predictors with more complex mathematical algorithm units.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

It should be noted that all embodiments and combinations we herein elucidate as encoders may also be realized (and are hereby disclosed and claimed) as decoders and vice versa, and also as methods, and resultant products, such as e.g. encoded image signals, or products comprising such, such as storage memories, and all uses of all the above.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality. Reference signs in the claims are provided merely as a clarifying example shall not be construed as limiting the scope of the claims in any way.

The invention claimed is:

1. An encoding apparatus for encoding first and second views of a high dynamic range (HDR) image, the apparatus comprising:
    first and second receivers configured to receive the first and second views;
    a first view predictor configured to predict the first view by automatically generating a mapping function in response to an input from a low dynamic range (LDR) representation of the first view and a corresponding reference HDR image, and the automatically generated mapping function that is also applicable for use in predicting the first view of consecutive HDR images of a same scene; and
    a second view predictor configured to predict the second view from at least one of the first view, an LDR representation of the second view, and an LDR representation of the first view.

2. The encoding apparatus of claim 1, wherein the mapping function is generated based on stored subsampled characteristics of a region in an image.

3. The encoding apparatus of claim 1, wherein the mapping function predicts the first view based on depth indications for spatial regions of the LDR representation.

4. The encoding apparatus of claim 1, wherein the first and the second views are jointly encoded, the first view is encoded without being dependent on the second view and the second view is encoded using data from the first view image, the encoded data is split into separate data streams including a primary data stream comprising data for the first view and a secondary data stream comprising data for the second view.

5. The encoding apparatus of claim 1, wherein at least one predictor is connected to several picture memories for storing prediction pictures.

6. The encoding apparatus of claim 4, further comprising an output processor configured to multiplex the primary and secondary data streams into an output encoded data stream and to provide data for the primary and secondary data streams with separate identification codes.

7. A decoding apparatus for obtaining first and second views of a high dynamic range (HDR) image, the apparatus comprising:
    a first receiver for receiving an encoded low dynamic range (LDR) image of the first view and a mapping function for predicting an HDR image from an LDR image, wherein the mapping function is also applicable for use in predicting consecutive HDR images from the LDR image of a same scene;
    a second receiver for receiving data of the first view;
    a third receiver for receiving data of the second view;
        a predictor for predicting, based on the mapping function, the first view from a decoded LDR image of the first view and the HDR data of the first view; and
    a decoder for producing the second view on the basis of at least one of
        the first view,
        a decoded LDR representation of the second view HDR, and
        the decoded LDR representation of the first view or a transformation thereof.

8. The decoding apparatus as claimed in claim 7, wherein the predictor is further arranged to predict the first view on the basis of derived depth information for the first view.

9. The decoding apparatus as claimed in claim 7, further comprising a formatter configured to separate interleaved combined stereo and HDR encoding information.

10. A method of encoding first and second views of a high dynamic range (HDR) image, the method comprising acts of:
    receiving the first and second views;
    predicting the first view by automatically generating a mapping function in response to an input from a low dynamic range (LDR) representation of the first view and a corresponding reference HDR image;

automatically generating a single mapping function that is also applicable for use in predicting the first view of consecutive HDR images of a same scene; and predicting the second view from at least one of the first view, an LDR representation of the second view, and an LDR representation of the first view.

11. A method of obtaining first and second views of a high dynamic range (HDR) image, the method comprising acts of:

receiving an encoded low dynamic range (LDR) image of the first view and a mapping function for predicting an HDR image from an LDR image, wherein the mapping function is also applicable for use in predicting consecutive HDR images from the LDR image of a same scene;

receiving data of the first and second views;

decoding the encoded LDR image of the first view to produce an LDR image of the first view;

predicting, based on the mapping function, the first view from the decoded LDR image of the first view and the HDR data of the first view; and producing the second view on the basis of at least one of
the first view,
a decoded LDR representation of the second view HDR, and
the decoded LDR representation of the first view or a transformation thereof.

* * * * *